United States Patent
Fukatani et al.

(10) Patent No.: US 8,392,458 B2
(45) Date of Patent: Mar. 5, 2013

(54) INFORMATION APPARATUS AND METHOD OF CONTROLLING THE SAME

(75) Inventors: Takayuki Fukatani, Yokohama (JP); Hitoshi Kamei, Sagamihara (JP); Yohsuke Ishii, Yokohama (JP); Masaaki Iwasaki, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 54 days.

(21) Appl. No.: 13/129,011

(22) PCT Filed: Apr. 22, 2011

(86) PCT No.: PCT/JP2011/002362
§ 371 (c)(1),
(2), (4) Date: May 12, 2011

(87) PCT Pub. No.: WO2012/143976
PCT Pub. Date: Oct. 26, 2012

(65) Prior Publication Data
US 2012/0271868 A1 Oct. 25, 2012

(51) Int. Cl.
*G06F 17/00* (2006.01)

(52) U.S. Cl. ......... 707/791; 707/802; 707/822; 707/828
(58) Field of Classification Search ........... 707/800–899
See application file for complete search history.

(56) References Cited

U.S. PATENT DOCUMENTS

| 7,165,059 | B1 | 1/2007 | Shah et al. |
| 2006/0230014 | A1 | 10/2006 | Kedem et al. |
| 2009/0282101 | A1 * | 11/2009 | Lim et al. ..................... 709/203 |

* cited by examiner

*Primary Examiner* — Isaac M Woo
(74) *Attorney, Agent, or Firm* — Volpe And Koenig, P.C.

(57) ABSTRACT

Appropriate control is performed for data blocks and data block groups in a file.
A file system having various functions provides an upper program with an interface for changing size, storage position and processing method in each function of extents being data block management units in a file. The file system can improve the effects aimed by the respective functions by implementing the extent configuration and processing optimized for the various functions of the file system, based on the instruction from the upper program.

10 Claims, 34 Drawing Sheets

Fig. 7

| VIRTUAL VOLUME PAGE NUMBER | LOGICAL BLOCK ADDRESS | TIER | PHYSICAL STORAGE DEVICE | PHYSICAL ADDRESS | FIX FLAG |
|---|---|---|---|---|---|
| 1 | 0x0000 | 1 | 1 | 0x1000 | |
| 2 | 0x1000 | 2 | 3 | 0x10 | 1 |
| 3 | 0x2000 | - | - | - | |

Fig. 8

| 3031 | TARGET FILE 3031A | PROCESSING METHOD 3031B | SCAN TARGET FILE 3031C | TARGET DATA BLOCK 3031D | UNIT SIZE 3031E | DESTINATION TIER 3031F |
|---|---|---|---|---|---|---|
| | .vmdk | SCAN AND SPLIT | *.pkg, data.tbl | - | - | 2 |
| | .mov | SPLIT | - | (0x00, 10MB) | - | 1 |
| | DEFAULT | ANALYZE AND SPLIT | - | - | 1MB | 1 |

Fig. 9

| PROPERTY | PROPERTY VALUE |
|---|---|
| DESTINATION TIER | 1 |

| PROPERTY | PROPERTY VALUE |
|---|---|
| COMPRESSION FLAG | 1 |
| COMPRESSED SIZE | 40KB |
| COMPRESSED FLAG | 1 |

Fig. 19

| TARGET FILE (3032A) | PROCESSING METHOD (3032B) | SCAN TARGET FILE (3032C) | TARGET DATA BLOCK (3032D) | UNIT SIZE (3032E) |
|---|---|---|---|---|
| *.mov | SPLIT | - | (0x00, 10MB) | |
| *.vmdk | SCAN AND SPLIT | *.jpg, *.mov | - | |
| DEFAULT | ANALYZE AND SPLIT | | | 1MB |

Fig. 27

| PROPERTY | PROPERTY VALUE |
|---|---|
| DE-DUP FLAG | 1 |
| DE-DUPED FLAG | 1 |
| POST DE-DUP DESTINATION | 0x12423 |
| DE-DUP COUNTER | 0 |

Fig. 28

| 3033 3033A | 3033B | 3033C | 3033D | 3033E |
|---|---|---|---|---|
| TARGET FILE | PROCESSING METHOD | UNIT SIZE | TARGET REGION | DE-DUP FLAG |
| *.doc | ADJUST EXTENT POSITION | 128KB | (0x1200, 10MB) | 0 |
| *.vmdk *.tar | SCAN AND SPLIT | 128KB | - | 0 |
| DEFAULT | ANALYZE AND STOP | - | - | 0 |

Fig. 29

| HASH KEY | VALUE |
|---|---|
| 13255123 | 0x120000 |
| 13255140 | 0x140000 |
| 13255180 | 0x010000 |

# INFORMATION APPARATUS AND METHOD OF CONTROLLING THE SAME

TECHNICAL FIELD

The present invention relates to an information apparatus and a method of controlling an information apparatus.

BACKGROUND ART

There has recently been developed a technology for changing storage devices and a method of compressing in file units.

For example, PTL 1 discloses a technology for increasing a file hierarchical control effect by specifying for each file a storage destination or whether or not to perform hierarchical control in a file system capable of performing hierarchical control in file units.

CITATION LIST

Patent Literature

PTL 1: US Patent Application Laid-open Publication No. 2006/0230014

SUMMARY OF INVENTION

Technical Problem

Files are configured of a plurality of data blocks. There are cases where the data contents and performance requirements differ in each data block or each data block group that configure the file. Contents of a process cannot be specified to a specific data block inside a file with the conventional method of specifying a process method in file units. Therefore, there is a problem that an appropriate process method cannot be selected for a data block or a data block group inside a file.

Solution to Problem

A means for solving the above problems includes a file system that manages as an extent, one or more data blocks in a file stored in a recording medium, a change request reception unit that receives a change request to change a configuration of an extent, and a configuration change unit that changes a configuration or property value of an extent according to the change request.

Other problems disclosed by the present application and methods of solving the problems will become apparent from the description of embodiments, accompanying drawings and others.

Advantageous Effects of Invention

According to the present invention, appropriate control of a data block or a data block group inside a file is made possible.

BRIEF DESCRIPTION OF DRAWINGS

FIG. 7 is an explanatory diagram showing a virtual page management table of the first embodiment.

FIG. 8 is an explanatory diagram showing an extent hierarchical management policy table of the first embodiment.

FIG. 9 is an explanatory diagram showing an extent extended property table of the first embodiment.

FIG. 18 is an explanatory diagram showing an extent extended property table of the second embodiment.

FIG. 19 is an explanatory diagram showing an extent compression policy table of the second embodiment.

FIG. 27 is an explanatory diagram showing an extent extended property table of the third embodiment.

FIG. 28 is an explanatory diagram showing an extent de-duplication policy table of the third embodiment.

FIG. 29 is an explanatory diagram showing a hash table of the third embodiment.

DESCRIPTION OF EMBODIMENTS

——First Embodiment——

(1-1) Configuration of First Embodiment

<Overall Configuration>

Figure 1:
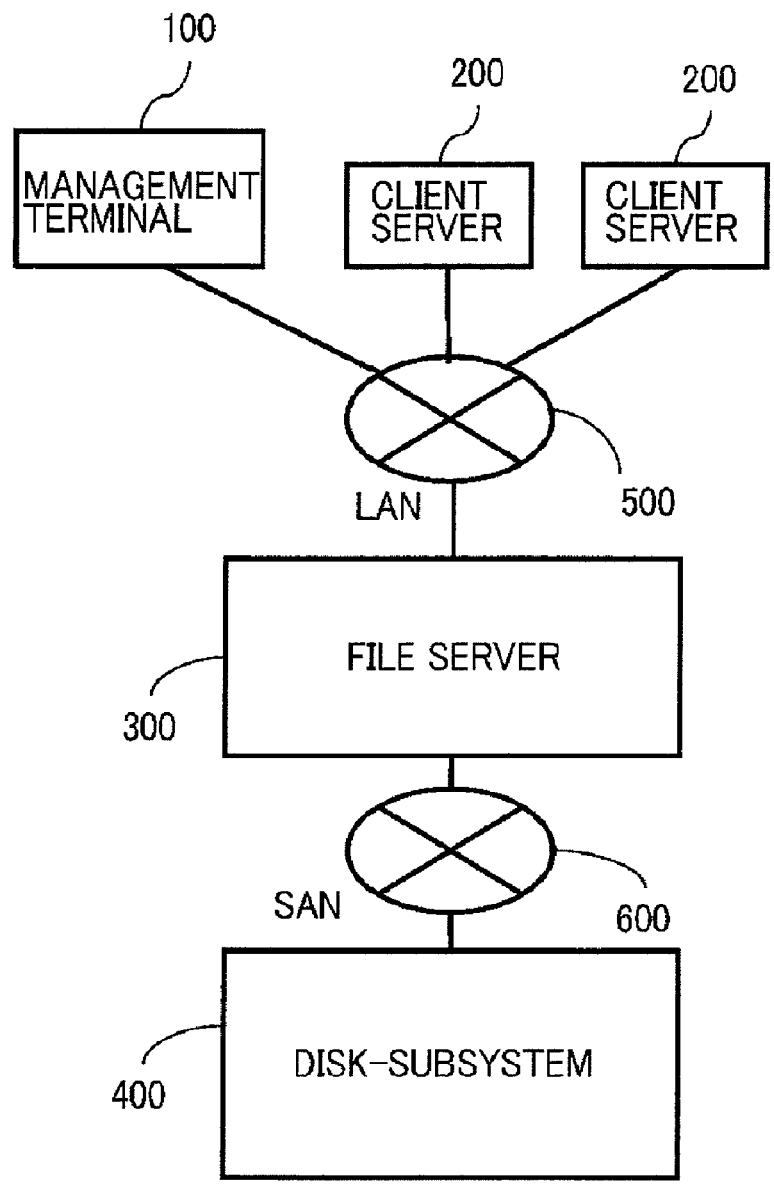
FIG. 1 is a block diagram showing an overall configuration of an information processing system of the first embodiment.

FIG. 1 is a block diagram showing a configuration of an information processing system according to the first embodiment.

The information processing system according to the first embodiment includes at least one file server 300, at least one disk-subsystem 400, at least one client server 200 and at least one management terminal 100.

The file server 300, the client server 200 and the management terminal 100 are communicatively coupled with each other through a local area network 500. Also, the file server 300 and the disk-subsystem 400 are communicatively coupled with each other through a storage area network 600.

The client server 200 is a computer which provides services such as, for example, a bank's automated teller service and an Internet web page browsing service. The disk-subsystem 400 provides a storage area in which a file generated by the client server 200 through implementing an application program is stored for example.

The file server 300 is a computer which controls files to be generated by the client server 200. The file server 300 provides the client server 200 with data to be stored in the disk-subsystem 400 as a file.

The disk-subsystem 400 is a storage device which stores, in units of data blocks, files written into the file server 300 by the client server 200. Note that a data block is a unit for storing fixed length data.

The hardware of each of the file server 300 and the disk-subsystem 400 is described in detail later with reference to FIG. 2.

The client server 200 is a computer such as a personal computer, a general-purpose server or a main frame. The client server 200 includes information input devices (not shown) such as a keyboard, switches, a pointing device and a microphone, as well as information output devices (not shown) such as a monitor display and a speaker.

As is the client server 200, the management terminal 100 is a computer such as a personal computer, a general-purpose server or a main frame.

The file server 300 and the client server 200 are coupled to the local area network 500. The file server 300 receives a data access request in units of files transmitted from the client server 200, and transmits to the client server 200 a processing result in response to the data access request.

Ethernet (registered trademark) is favorable as the local area network 500 for example.

The management terminal 100 is also coupled to the local area network 500. The file server 300 receives a management access request transmitted from the management terminal 100 through the local area network 500, and transmits to the management terminal 100 a processing result in response to the management access request.

TCP/IP (Transmission Control Protocol/Internet Protocol) or UDP/IP (User Datagram Protocol/Internet Protocol) is favorable as a communication protocol of the local area network 500. Moreover, NFS (Network File Storage), CIFS (Common Internet File System), HTTP (Hyper Transport Transfer Protocol), iSCSI (Internet Small Computer System Interface) or the like are favorable as an upper protocol.

Note that the local area network 500 may include a network (e.g., a management network) which communicatively couples the management terminal 100 with the file server 300, and a network (e.g., a data network) which communicatively couples the client server 200 with the file server 300 that are independent from each other.

The file server 300 and the disk-subsystem 400 are coupled to the storage area network 600. The disk-subsystem 400 receives a data access request in units of data blocks from the file server 300, and transmits to the file server 300 a processing result in response to the data access request.

Ethernet (registered trademark) and Fibre Channel are favorable as the storage area network 600, for example. While this embodiment shows the example where the local area network 500 and the storage area network 600 are two independent networks, these networks may be one common network.

<Hardware Configuration>

Figure 2:
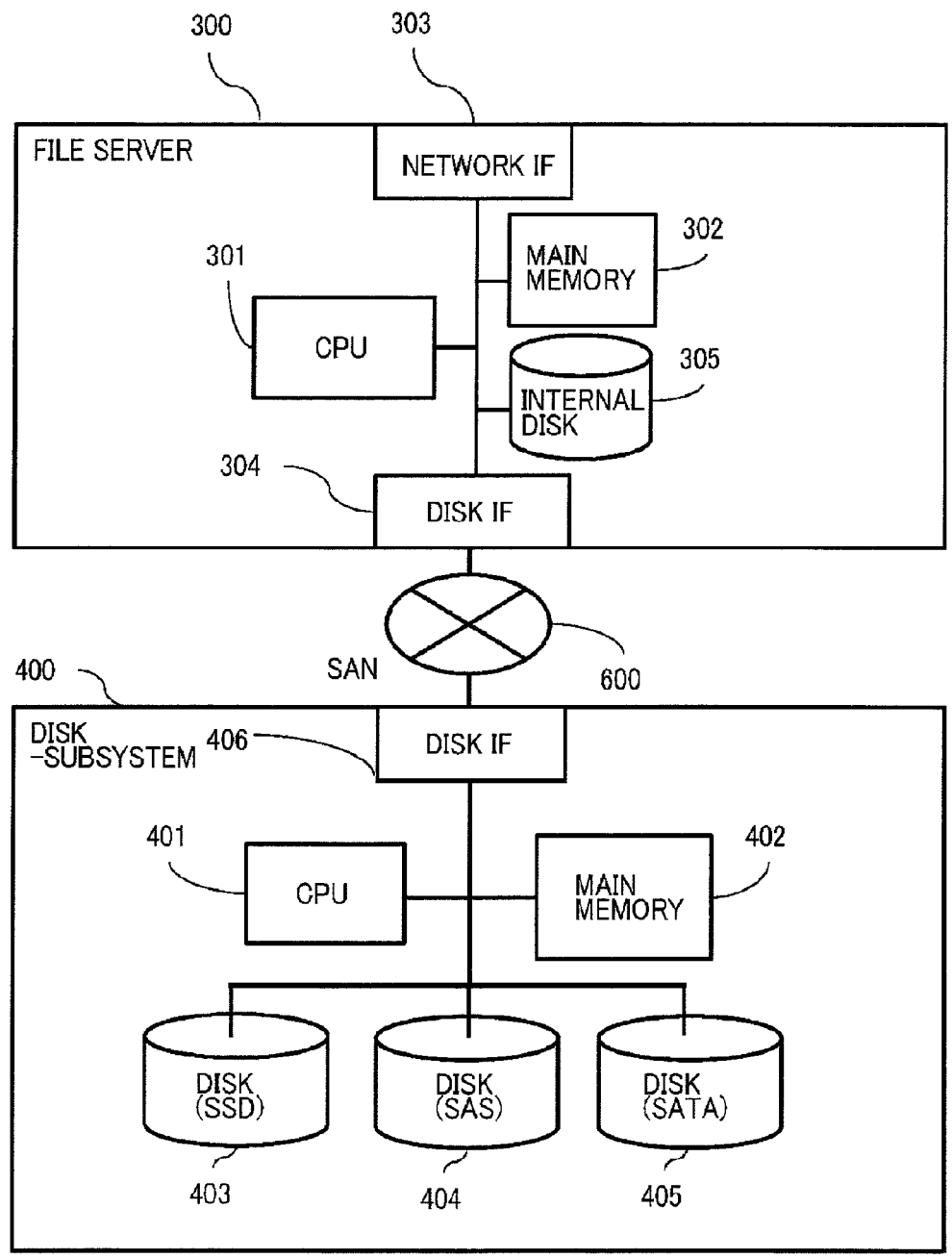
FIG. 2 is a block diagram showing a hardware configuration of the information processing system of the first embodiment.

FIG. 2 is a block diagram showing a hardware configuration example of the file server 300 and disk-subsystem 400 according to the first embodiment.

The file server 300 includes a CPU 301 (Central Processing Unit), a main memory 302 and an internal disk 305.

The file server 300 further includes a network IF (InterFace) 303 for coupling to the local area network 500, and a disk IF (InterFace) 304 for coupling to the storage area network (SAN) 600.

Note that when two or more file servers 300 are coupled to the SAN 600, those file servers 300 may form a cluster.

The CPU 301 implements various functions of the file server 300 according to the present embodiment by reading into the main memory 302 various programs stored in the internal disk 305 and executing those programs.

In FIG. 2, the main memory 302 is a storage device which stores various programs to be described later. The internal disk 305 is a nonvolatile storage device which stores various programs and management information to be described later.

The network IF 303 includes a network interface card such as an Ethernet interface card (Ethernet is a registered trademark) and a wireless LAN (Local Area Network) interface card. The network IF 303 functions as a data I/O adapter for coupling the file server 300 to the client server 200 or the management terminal 100.

The disk IF 304 includes a SCSI (Small Computer System InterFace) interface card, a Fibre Channel interface card or the like. The disk IF 304 functions as a data I/O adapter for coupling the file server 300 to the disk-subsystem 400.

The disk-subsystem 400 includes a CPU 401, a main memory 402, one or more storage devices (also described as storage media or storage devices) 403, 404 and 405, and a disk IF 406. Note that the storage devices 403, 404 and 405 are also collectively described as a storage device 410 without making any distinction between the devices.

The CPU 401 implements various functions of the disk-subsystem 400 according to the present embodiment by executing various programs read into the main memory 402.

In FIG. 2, the main memory 402 is a semiconductor storage device which stores the above-mentioned various programs. The disk IF 406 functions as a data I/O adapter for coupling the disk-subsystem 400 to the file server 300.

The storage device (SSD) 403, storage device (SAS) 404 and storage device (SATA) 405 are nonvolatile storage devices having different access characteristics. For example, the storage devices 403, 404 and 405 differ from each other in at least one of data read rate or data write rate.

While the storage device (SSD) 403 uses an SSD (Solid State Disk) as a storage medium and thus can return a response to the data access with relatively low delay, the price per capacity thereof is relatively high.

The storage device (SAS) 404 uses an HDD (Hard Disk Drive) having an SAS (Serial Attached SCSI) interface as a storage medium and, compared with the storage device (SSD) 403, data access is more delayed but the price per capacity thereof is low.

The storage device (SATA) 405 uses an HDD (Hard Disk Drive) having an SATA (Serial Advanced Technology Attachment) interface as a storage medium and, compared with the storage device (SAS) 404, data access is more delayed but the price per capacity thereof is low.

The storage devices 410 are used as data block-level data storage devices. Moreover, as described later, a disk hierarchical control program 4022 stores data in a storage device 410 in accordance with performance requirements of the data.

The file server 300 and the disk-subsystem 400 are coupled to each other through the storage area network 600. The file server 300 and the disk-subsystem 400 may be coupled to each other via a switch or may be coupled to each other directly, i.e., without any switches.

A communication protocol such as SCSI or iSCSI is favorable as a communication protocol of the storage area network 600.

While this embodiment shows an example where the file server 300 and the disk-subsystem 400 are two different apparatuses, the disk-subsystem 400 and the file server 300 may be integrated into one apparatus.

<Software Configuration>

Figure 3:
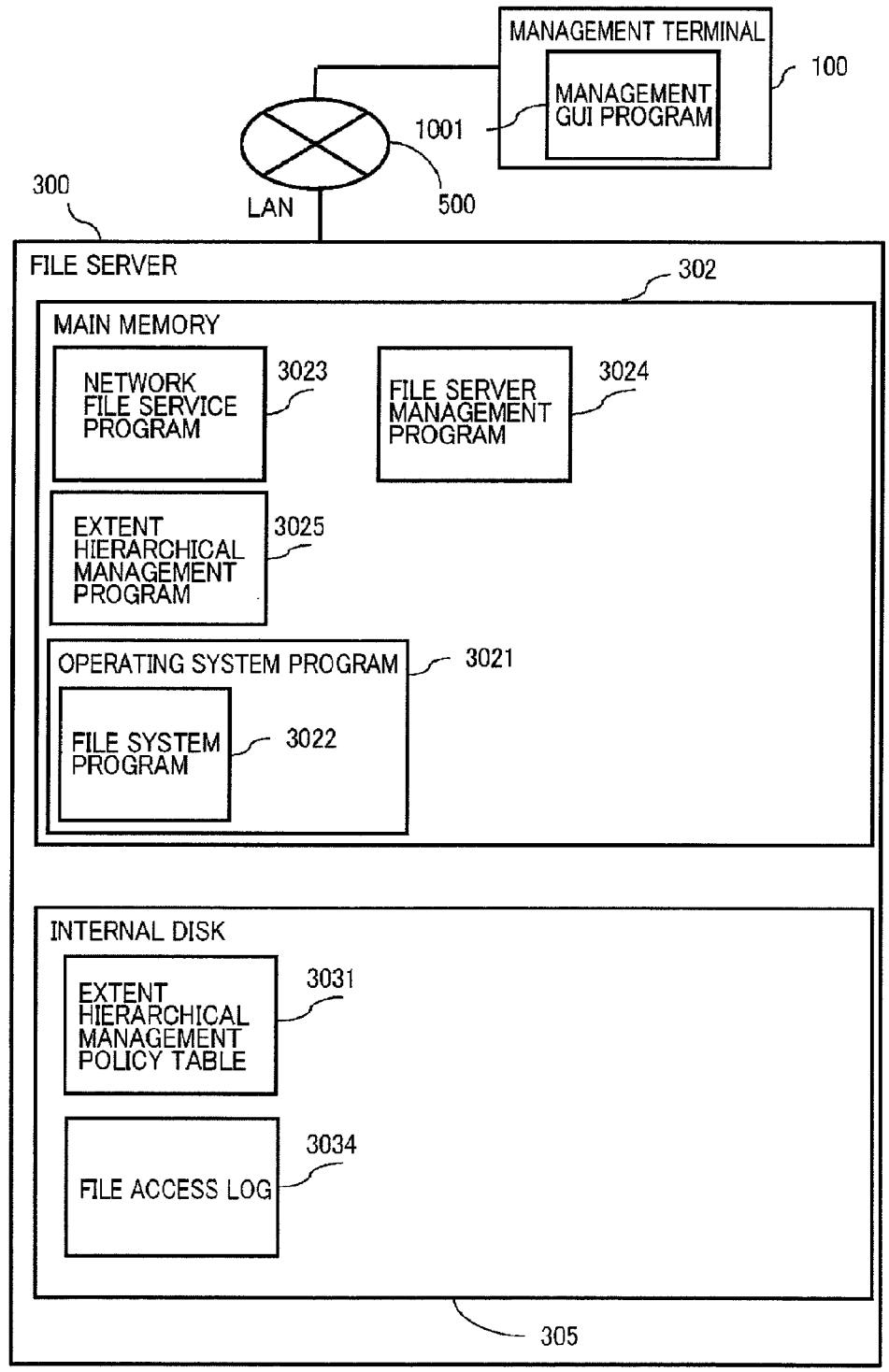
FIG. 3 is a block diagram showing a software configuration of a file server of the first embodiment.

FIG. 3 is a block diagram showing a software configuration example of the file server 300 according to the present embodiment.

The file server 300 executes operating system program 3021, file system program 3022, network file service program 3023, file server management program 3024, and extent hierarchical management program 3025. The file server 300 also stores extent hierarchical management policy table 3031 and file access log 3034.

Note that, in the present embodiment, the file system program 3022 is included in the operating system program 3021.

The operating system program 3021 has an I/O control function, a read/write control function for storage devices such as a disk, a memory, and the like, and provides the other programs with these functions. The file system program 3022 provides a function to access, in units of files or folders containing files or folders, data stored in units of data blocks in the disk-subsystem 400.

The file system program 3022 implements a function as a file system. Also, the file system program 3022 according to the present embodiment provides the other programs with interfaces for creating and moving an extent and for changing property values of an extent. These interfaces are described later. In the present embodiment, an extent is configured of one or more data blocks of the plurality of data blocks configuring a file.

The network file service program 3023 provides the client server 200 with an interface for accessing the file system program 3022.

The file server management program 3024 cooperates with management GUI program 1001 running on the management terminal 100, and provides an interface for an administrator to set the file server 300.

The extent hierarchical management program 3025 instructs the file system program 3022 to change the configuration of the extent and to move the extent to a higher tier according to the extent hierarchical management policy table 3031 set by the administrator. The extent hierarchical management policy table 3031 is described later. To implement these operations, the extent hierarchical management program 3025 co-operates with the disk hierarchical control program 4022 running on the disk-subsystem 400.

In the extent hierarchical management policy table 3031, settings made by the administrator for hierarchical control are registered. The extent hierarchical management policy table 3031 is stored in the internal disk 305. The extent hierarchical management policy table 3031 will be later described with reference to FIG. 8.

The file access log 3034 records an access history log for each file.

Figure 4:
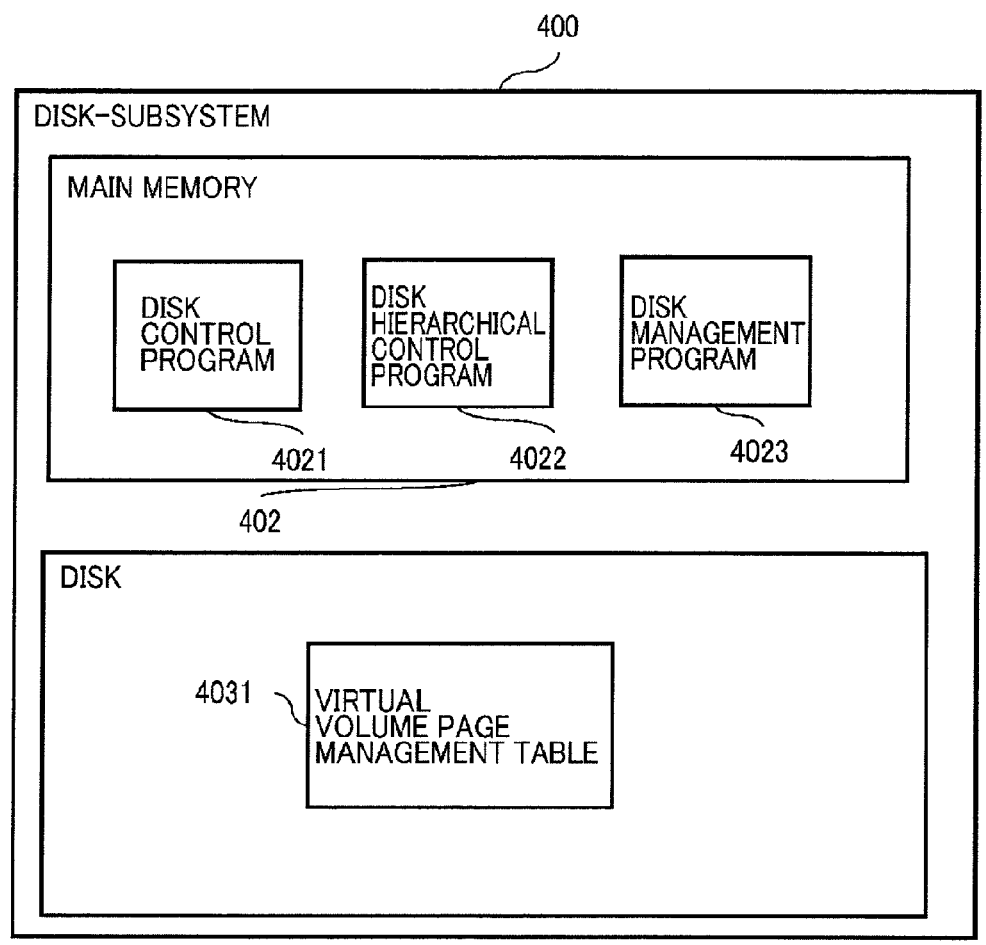
FIG. 4 is a block diagram showing a software configuration of a disk-subsystem of the first embodiment.

FIG. 4 is a block diagram showing a software configuration example of the disk-subsystem 400 according to the present embodiment.

A disk control program 4021 is a program for returning, in response to an access request in units of data blocks received from the file server 300 and having a logical block address specified, data stored at a corresponding physical block address. Note that, here, the logical block address is a logical address indicating a storage location of each data block, while the physical block address is an address indicating a physical storage location of the data block.

The disk control program 4021 manages the storage device 410 by splitting the device into fixed-length (e.g., 42 megabytes) address spaces called physical volume pages. The disk control program 4021 consolidates the physical volume pages on the plurality of storage devices 410 to construct a virtual volume pool, and provides the client server 200 with a virtual volume.

The virtual volume pool is a group of physical volume pages. The virtual volume is a virtual volume that can be accessed using a logical block address.

The virtual volume is configured of virtual volume pages. The virtual volume page is a concept of a virtual page having a fixed-length logical block address space. In response to a write request to the virtual volume, the disk control program 4021 assigns a physical volume page to a virtual volume page and stores data in the physical volume page.

Moreover, the virtual volume pages are classified into tiers according to the performance characteristics of the assigned physical volume pages. The higher-tier virtual volume page is assigned to the physical volume page of a higher-performance storage device 410, while the lower-tier virtual volume page is assigned to a physical volume page of a lower-performance storage device 410.

For example, the high-tier virtual volume page is assigned to the physical volume page on the storage device (SSD) 403. A mid-tier virtual volume page is assigned to the physical volume page on the storage device (SAS) 404. The low-tier virtual volume page is assigned to the physical volume page on the storage device (SATA) 405.

The disk hierarchical control program 4022 performs control to change the physical volume page to be assigned to the virtual volume page.

The disk hierarchical control program 4022, for example, moves a high-tier virtual volume page to a lower tier or, on the contrary, moves a low-tier virtual volume page to a higher tier. The disk hierarchical control program 4022 monitors the access frequency of each virtual volume page, and performs control to move a frequently-accessed virtual volume page to a high tier and an infrequently-accessed virtual volume page to a low tier.

Moreover, the disk hierarchical control program 4022 provides the file server 300 with an interface for moving a virtual volume page to another tier and fixing the page at the tier. This interface is described later with reference to FIG. 14.

A disk management program 4023 cooperates with the management GUI program 1001 running on the management terminal 100, and provides an interface for the administrator to set the disk-subsystem 400.

A virtual volume page management table 4031 manages correlation between the logical block address of the virtual volume page and the physical storage location. The virtual volume page management table 4031 is stored in a portion of the storage device (SSD) 403. The virtual volume page management table 4031 is described later with reference to FIG. 7.

The phrase "executed by the program" in the following description of the functions of the file server 300, disk-subsystem 400 and management terminal 100 means "program executed by the CPU" included in each device.

(1-2) Outline of First Embodiment

In the present embodiment, the file system program 3022 in the file server 300 provides an upper program with an interface for creating and moving an extent.

This allows the extent hierarchical management program 3025 to change the configuration of an extent or to move extents in units of extents to a different tier. Moreover, a data area in a file can be moved to a different tier without constraints of file size and virtual volume page size.

Thus, unnecessary capacity consumption can be prevented, which is caused by movement of the whole file or whole virtual volume page when the inter tier movement is performed in units of files or virtual volume pages.

As is described in detail later, when the file server 300 according to the present embodiment performs hierarchical movement control for each of the files stored in the storage device 410, the extent hierarchical management program 3025 instructs the file system program 3022 to split an extent storing a data block portion as a target for hierarchical movement, and moves the extent to a predetermined virtual volume page provided according to a destination tier.

Thereafter, the extent hierarchical management program 3025 causes the disk-subsystem 400 to move the above-mentioned virtual volume page provided according to the destination to the corresponding destination storage device 410.

Accordingly, the hierarchical movement of the file data can be performed for data blocks of any size in a file without constraints of the file unit or virtual volume page unit. Thus, for example, a data block to be moved to a high tier can be limited to only a necessary portion, and thus capacity consumption in the higher tiers can be reduced.

For example, by only a head region of a huge multimedia file having recorded voices, videos and the like, which is required for an upper application program to execute buffering is stored in a high tier, and thus response time during reproduction can be reduced while the capacity consumption in the high tier can be reduced.

Moreover, by only a specific relatively frequently accessed file among the virtual hard disk files is moved to a high tier, an effect of improvement in high performance can be achieved while reducing the capacity consumption in the high tier.

The virtual hard disk files here mean data obtained by virtually storing disk images of the physical device in file format. Note that while the description has been given in the present embodiment of an example where a portion of a file is moved to the high tier, this is merely an example. A control for moving only a portion of a file to a low tier can also be implemented.

The overall processing flow is described with reference to FIG. 5.

Figure 5:
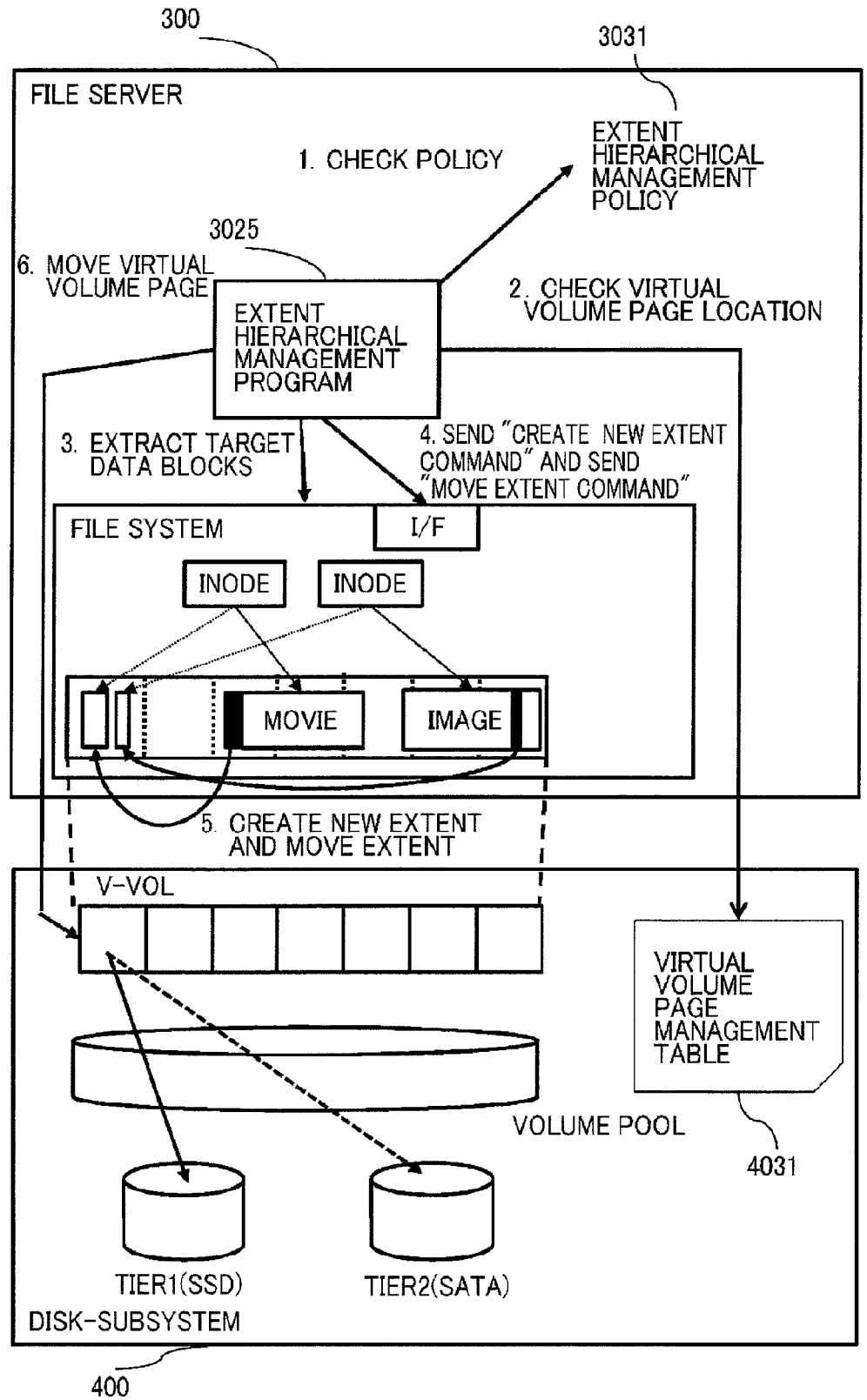
FIG. 5 is an explanatory diagram showing an outline of the first embodiment.

The extent hierarchical management program 3025 checks a processing method for each file by referring to the extent hierarchical management policy table 3031 set by the administrator (corresponding to "1" in FIG. 5).

Next, the extent hierarchical management program 3025 checks the current tier of a virtual volume page in which the file is stored by referring to the virtual volume page management table 4031 in the disk-subsystem 400 (corresponding to "2" in FIG. 5).

The extent hierarchical management program 3025 accesses the file system program 3022 to search files and extract target data blocks for and hierarchical movement (corresponding to "3" in FIG. 5). Note that the target data blocks for hierarchical movement are specified by referring to the extent hierarchical management policy table 3031.

The extent hierarchical management program 3025 then instructs the file system program 3022 to create an extent including the extracted one or more of data blocks and to move the extent to a predetermined virtual volume page provided according to a destination tier of the data block (corresponding to "4" in FIG. 5).

Note that the instruction from the extent hierarchical management program 3025 to the file system program 3022 is made through an interface provided by the file system program 3022. The system call, for example, is favorable as the interface here.

Upon receipt of the instruction, the file system program 3022 creates the instructed extent and moves the extent to the specified virtual volume page (corresponding to "5" in FIG. 5).

The extent hierarchical management program 3025 instructs the disk-subsystem 400 to move the virtual volume page to a different tier (corresponding to "6" in FIG. 5).

(1-3) Example of First Embodiment

<Extent Management>

Figure 6:
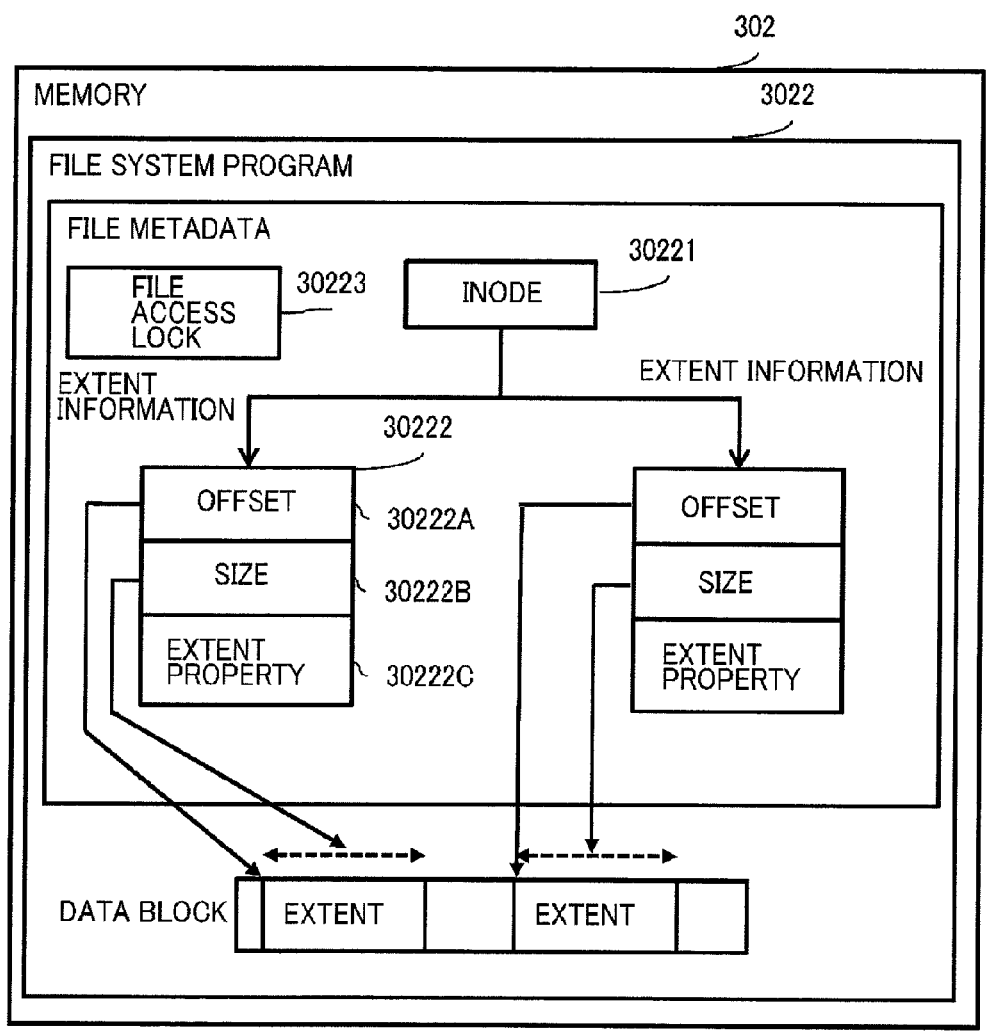
FIG. 6 is an explanatory diagram showing file management information of the first embodiment.

FIG. 6 is an explanatory diagram of file management by the file system program 3022 according to the present embodiment.

The file system program 3022 manages each file using a management structure called an Mode 30221 provided for each file. Also, the file system program 3022 has a file access lock 30223 for each file in order to perform exclusive access control when there are requests to access a file from multiple processes.

The Mode 30221 has extent information 30222 for managing an extent.

The extent information 30222 has information concerning an offset 30222A from a file start position of the extent, and information concerning size 30222B of the extent. The offset 30222A is managed by a logical block address.

The extent information 30222 further includes an extent property table 30222C (described later in FIG. 9) storing properties indicating a processing method and a state of each extent.

As described above, the file system program 3022 according to the present embodiment can manage the storage location and properties of the extent in the logical block address space in the file by using the Mode structure 30221.

<Virtual Volume Page Management>

FIG. 7 is an explanatory diagram showing the virtual volume page management table 4031.

The virtual volume page management table 4031 has columns for virtual volume page number 4031A, logical block address 4031B, tier 4031C, physical storage device 4031D, physical address 4031E and fix flag 4031F.

The virtual volume page number 4031A is an identifier for uniquely identifying each of the virtual volume pages present in a single virtual volume pool.

The logical block address 4031B is an initial logical block address of a virtual volume page.

The tier 4031C is an identifier of a tier in which the virtual volume page is currently stored. In the present embodiment, the smaller the number, the higher the tier.

The physical storage device 4031D is an identifier of the storage device 410 in which the virtual volume page is stored.

The physical address 4031E is an initial physical address of a physical volume page in the storage device 410.

The fix flag 4031F indicates whether or not hierarchical movement is to be executed for the virtual volume page. The disk hierarchical control program 4022 sets the virtual volume page to be a hierarchical control target if the fix flag 4031F is set to 1, and excludes the virtual volume page from the target if the fix flag 4031F is set to 0.

<Policy Management>

FIG. 8 is an explanatory diagram showing the extent hierarchical management policy table 3031.

The extent hierarchical management policy table 3031 has columns for target file 3031A, processing method 3031B, scan target file 3031C, target data block 3031D, unit size 3031E, and destination tier 3031F.

In the target file 3031A, a file name or directory name to be the policy target is listed. The file name or directory name can also be specified by path notation using a regular expression. The regular expression is a method for expressing strings of text with one text.

When "default" meaning default processing is set in target file 3031A, all the files for which no policies are individually set are the policy target.

In processing method 3031B, information specifying a method for extracting a data block to be moved to a different tier is described. As the data block extraction method, any of the following four types can be set: "split", "scan and split", "analyze and split", and "none".

When "split" is set, a data block stored in a position specified in the target data block 3031D column is set to be a hierarchical movement target. When "scan and split" is set, a data block having a specific file stored therein is extracted from virtual files obtained by connecting multiple files such as image files, and the data block is set to be a hierarchical movement target.

When "analyze and split" is specified, the file access log 3034 is analyzed, and a frequently-accessed portion in the file is specified and set to be a hierarchical movement target. When "none" is specified, no extent hierarchical management is performed.

In the scan target file 3031C, a file name of a loop-back device to be an extent hierarchical management target or a file name in a connected file is specified when "scan and split" is set as the data block extraction method. These file names may be folder names. Moreover, the file name or folder name may be specified using a regular expression.

Note that the loop-back device described here is a device which stores virtual disk images in file format. For the loop-back device, a vmdk (virtual machine disk) file or an ISO file is favorable.

Moreover, a connected file means a file obtained by connecting a plurality of files into a single file. A tar file is favorable as the connected file.

In the target data block 3031D, the offset and size of a region to be an extent hierarchical movement target are specified when "split" is set as the processing method.

In the unit size 3031E, an access frequency analysis unit is specified when "analyze and split" is set as the processing method. The extent hierarchical management program 3025 calculates an access frequency for each region of the size specified in the unit size 3031E, and calculates whether or not hierarchical movement is required.

<Property Management>

FIG. 9 is an explanatory diagram showing the extent extended property table 30222C.

The extent extended property table 30222C has columns for a property 30222C1 and a property value 30222C2. In the first embodiment, "destination tier" is set in the property and "value indicating the destination tier" is set in the property value. In the example shown in FIG. 9, tier 1 is specified as the destination.

<Processing Flow>

Figure 10:
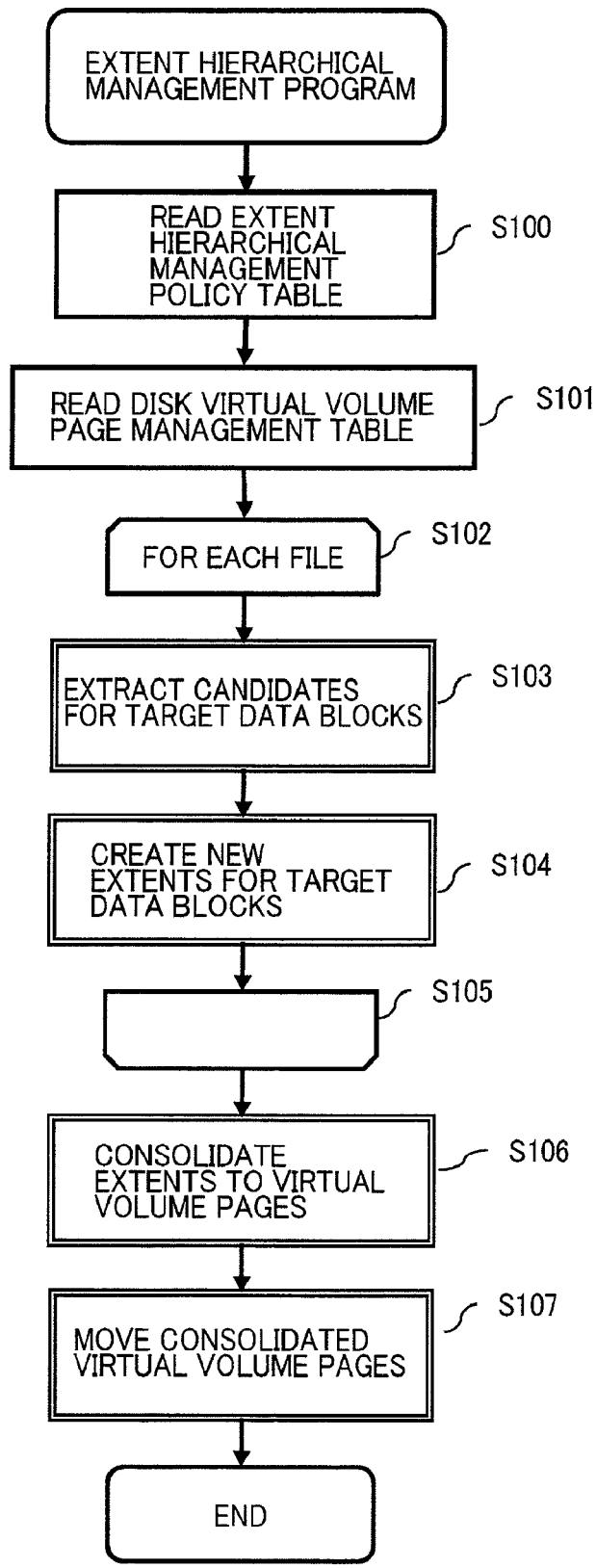
FIG. 10 is a flowchart of extent hierarchical management processing of the first embodiment.

FIG. 10 is a flowchart showing a flow of processing by the extent hierarchical management program 3025 in the extent hierarchical management processing. Note that respective processes S103, S104, S106 and S107 are described later with reference to FIGS. 11 to 14.

The extent hierarchical management program 3025 refers to the extent hierarchical management policy table 3031 and creates a new extent by extracting a data block as a hierarchical movement target from a file according to the settings in the extent hierarchical management policy table 3031.

Then, the extent hierarchical management program 3025 moves the created extent to a virtual volume page provided for its destination tier. Thereafter, the extent hierarchical management program 3025 moves the destination virtual volume page to corresponding destination storage device 410.

To be more specific, the extent hierarchical management program 3025 reads the extent hierarchical management policy table 3031 and acquires a processing method for each file (S100).

Next, the extent hierarchical management program 3025 checks a current storage tier of each virtual volume page by referring to the virtual volume page management table 4031 stored in the disk-subsystem 400 (S101).

Then, the extent hierarchical management program 3025 performs the processes from S103 to S104 on each file (S102).

Thereafter, the extent hierarchical management program 3025 extracts a data block to be a movement candidate from the file in processing, according to the processing method acquired in S100 (S103). This process is described in detail with reference to FIG. 11.

The extent hierarchical management program 3025 treats, as the data block to be moved, a data block whose current storage tier is different from the tier specified by the destination tier 3031F in the extent hierarchical management policy table 3031, among the data blocks extracted in S103 as the movement candidates extracted in S103.

The extent hierarchical management program 3025 instructs the file system program 3022 to create a new extent for the data block to be moved (S104). This process is described in detail with reference to FIG. 12.

The extent hierarchical management program 3025 continues to perform processes S102 and thereafter when there is a file left to be processed, and otherwise proceeds to S106 (S105).

Then, the extent hierarchical management program 3025 instructs the file system program 3022 to consolidate the extents to be moved to the predetermined virtual volume page provided for each of the destination tier (S106). This process is described in detail with reference to FIG. 13.

Subsequently, the extent hierarchical management program 3025 instructs the disk-subsystem 400 to move the virtual volume page, in which the data blocks to be moved are consolidated in S106, to its destination tier (S107). This process is described in detail with reference to FIG. 14.

Figure 11:
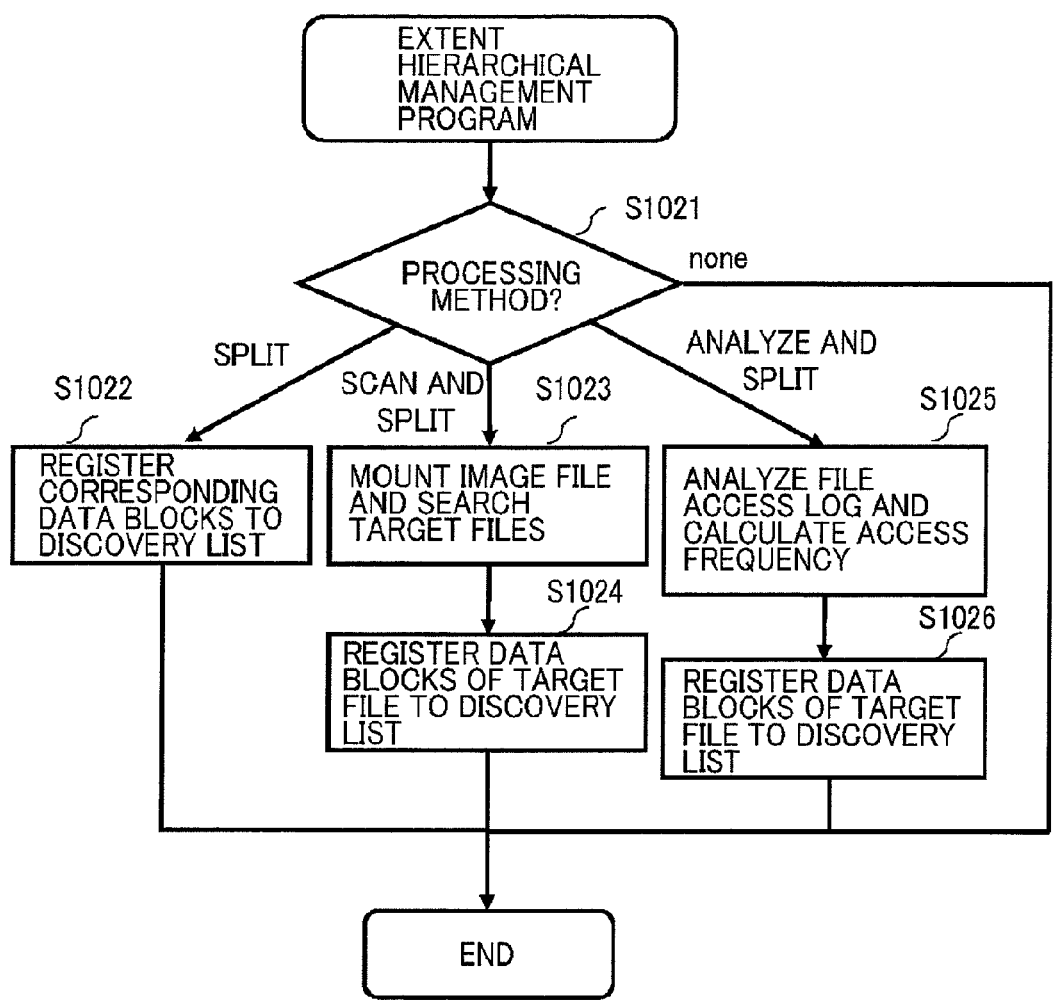
FIG. 11 is a flowchart of target data block extraction processing in the extent hierarchical management of the first embodiment.

FIG. 11 is a flowchart showing operations of the extent hierarchical management program 3025 during extraction of data blocks as movement candidates.

In this processing, the extent hierarchical management program 3025 searches for a data block corresponding to the contents listed in the extent hierarchical management policy table 3031, as a hierarchical movement candidate, and registers the data block in a discovery list.

The extent hierarchical management program 3025 moves to S1022 when the processing method 3031B for the file from which the data block is extracted is "split", moves to S1023 if the processing method is "scan and split", moves to S1025 if the processing method is "analyze and split", and terminates the processing if the processing method is "none" (S1021).

The extent hierarchical management program 3025 registers the data block corresponding to the target data block 3031D in the discovery list when the processing method 3031B is "split", and then terminates the target data block extraction processing (S1022).

Note that, although omitted from FIG. 11, when the data block specified in the target data block 3031D is not included in the file, the extent hierarchical management program 3025 terminates the target data block extraction processing without performing registration in the discovery list.

The extent hierarchical management program 3025 checks if the file in processing is a loop-back device when the processing method 3031B is "scan and split", and mounts a virtual disk image in the target file. On the other hand, the extent hierarchical management program 3025 directly scans the data of each of the files included in the file when the file in processing is a connected file.

The extent hierarchical management program 3025 searches through the virtual disk images or connected files for the file specified by the scan target file 3031C, and stores a location thereof in the virtual disk image or the connected file (S1023).

Note that, although omitted from FIG. 11, when the extent hierarchical management program 3025 fails to mount the loop-back device or to scan the connected files, the target data block extraction processing is terminated.

The extent hierarchical management program 3025 registers the target data block found in S1023, and then terminates the target data block extraction processing (S1024).

When the processing method 3031B is "analyze and split", the extent hierarchical management program 3025 analyzes the file access log 3034 and calculates an access frequency for each data block specified in the unit size column 3031E in the file (S1025).

When there is a data block for which the access frequency calculated in S1025 exceeds a threshold value, the extent hierarchical management program 3025 registers the data block in the discovery list, and then terminates the data block extraction processing (S1026).

Note that although the threshold value is an eigen value previously set in the file server 300 in the present embodiment, the threshold value may be a value specified by the administrator.

Figure 12:
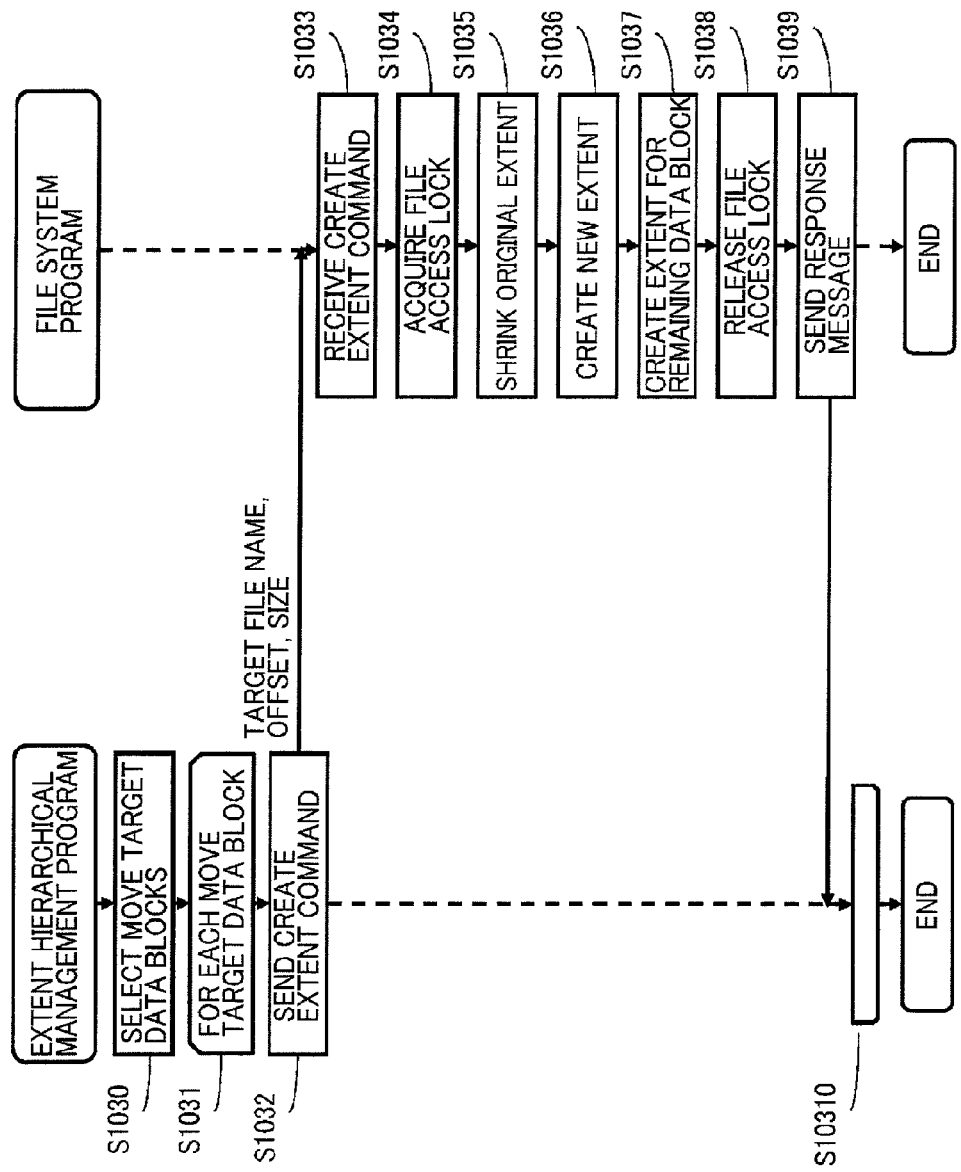
FIG. 12 is a flowchart of extent creation processing in the extent hierarchical management of the first embodiment.

FIG. 12 is a flowchart of the processing in S104 in which the extent hierarchical management program 3025 and the file system program 3022 extract a data block required to be moved to a different tier from the data blocks registered in the discovery list, and create an extent of the data block portion by dividing the extent in the file including the data block.

In the extent creation processing, the extent hierarchical management program 3025 selects a data block required to be moved to a different tier from the data blocks extracted in S103, and instructs the file system program 3022 to create an extent.

As described above, the file system program 3022 according to the present embodiment has an interface for creating a new extent for the specified data block in the file, and the extent hierarchical management program 3025 uses this interface.

When the current tier of the data block registered in the discovery list is different from the tier listed in the destination tier 3031F column, the extent hierarchical management program 3025 sets the data block as the movement target (S1030).

Then, the extent hierarchical management program 3025 performs the process in S1032 on the data block set as the movement target (S1031).

Thereafter, the extent hierarchical management program 3025 sends a create extent command to the file system program 3022 (S1032). The arguments of the create extent command are, for example, a file name of process target, an offset and a size of the data block in the file.

The file system program 3022 receives the create extent command (S1033).

Then, the file system program 3022 acquires the file access lock 30223 (S1034). If the file access lock 30223 is being used in another process and cannot be acquired, the file system program 3022 suspends the process until the file access lock 30223 can be acquired.

The file system program 3022 splits the extent at a first position specified by the offset and a second position determined by an additional value obtained by adding the size to the offset.

To be more specific, the file system program 3022 first changes the extent containing the data block specified by the create extent command to a position right before the position of a same data block (before the first position) (S1035). The extent is changed by reducing the size 30222B of the extent information 30222.

Next, the file system program 3022 creates a new extent corresponding to the region (region from the first position to the second position) specified by the create extent command (S1036). The new extent is created by newly adding extent information 30222 having a data block offset as the offset 30222A and a size thereof as the size 30222B to the Mode 30221. Moreover, a destination tier is registered in the properties in the extent extended property table 30222C of the newly created extent.

Then, the file system program 3022 creates an extent corresponding to the rest of data blocks (region after the second position) in the extent shrunk in S1035 (S1037).

Note that although not shown in FIG. 12, if the data block specified by the create extent command covers a plurality of extents, an extent is created after a region for the extent to be newly created is secured. Further, an extent corresponding to the remaining data block portion in the extent containing the last data block is created.

The file system program 3022 releases the file access lock 30223 (S1038).

Then, the file system program 3022 transmits a response message to the extent hierarchical management program 3025 (S1039).

When there is an other data block found by the data block extraction process, the extent hierarchical management program 3025 returns to S1031 to perform the new extent create process again, and otherwise terminates the processing (S10310).

Figure 13:
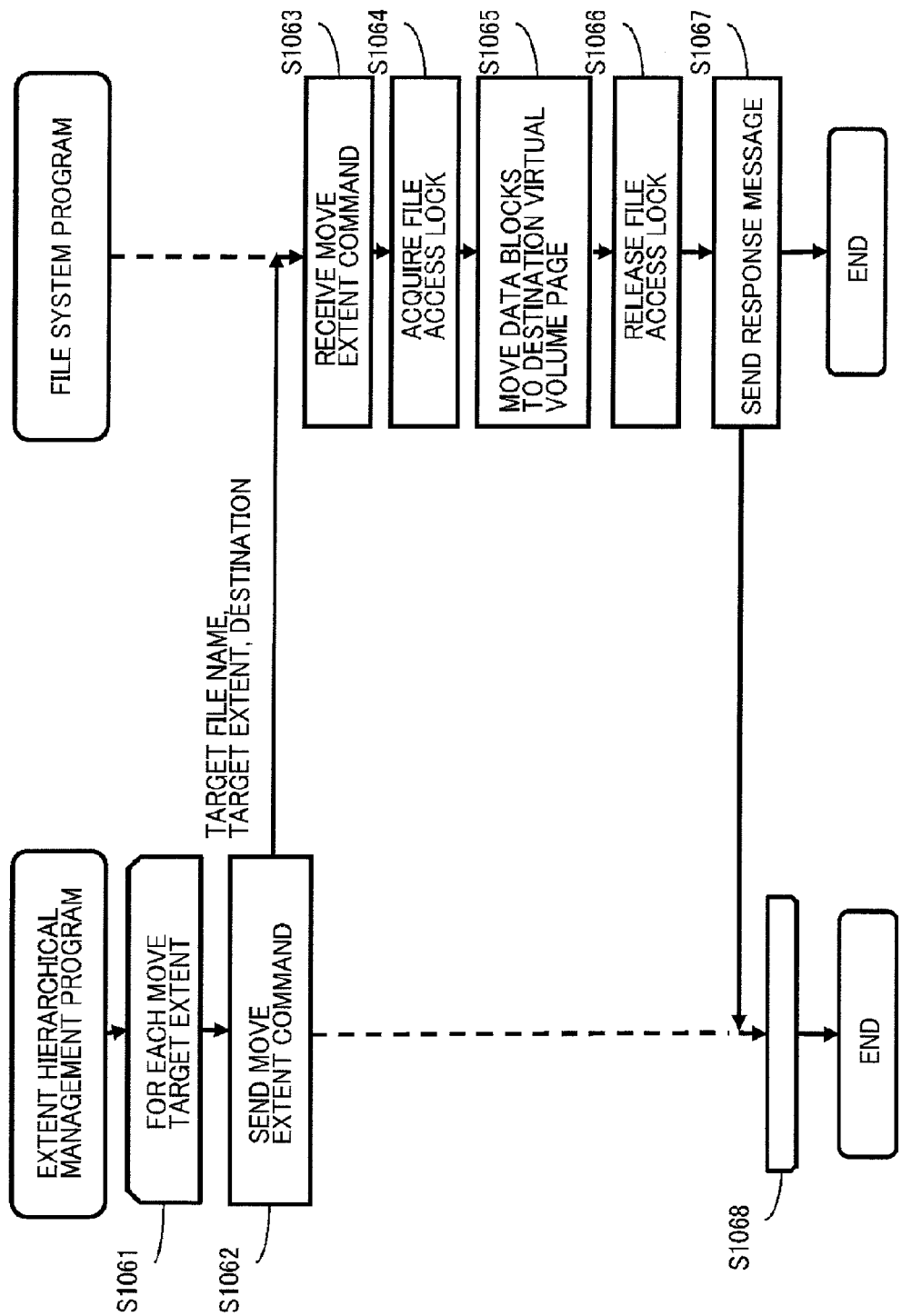
FIG. 13 is a flowchart of extent movement processing in the extent hierarchical management of the first embodiment.

FIG. 13 is a flowchart showing operations of the extent hierarchical management program 3025 and the file system program 3022 in the extent movement processing.

The extent movement processing is processing of consolidating the movement target extents, created in S104, to a specific one of the virtual volume pages provided for tiers listed in destination tiers 3031F in the extent hierarchical management policy table 3031. The specific virtual volume page here may be an already assigned virtual volume page or a new virtual volume page assigned from the virtual volume pool.

The extent hierarchical management program 3025 performs a process in S1062 for each of the extents created in S104 (S1061).

The extent hierarchical management program 3025 transmits a move extent command to the file system program 3022 (S1062). The move extent command specifies, as arguments, a name of the movement target file, an offset of the movement target extent, and a logical block address of a destination virtual volume page.

The extent hierarchical management program 3025 determines the destination virtual volume page so that the extents having the same destination tier 3031F are consolidated in the same virtual volume page.

Note that, although omitted from FIG. 13, when the extent size is larger than the virtual volume page size, all the virtual volume pages included in the extent are set as the hierarchical movement target without performing the extent movement processing.

The file system program 3022 receives the move extent command (S1063).

The file system program 3022 acquires the file access lock 30223 of the file specified by the move extent command (S1064). When the file access lock 30223 is being used in another process and cannot be acquired, the file system program 3022 suspends the process until the file access lock 30223 can be acquired.

The file system program 3022 secures a free space in the virtual volume page being a destination of the logical block address specified by the move extent command, and moves the extent thereto (S1065). After moving the extent, the file system program 3022 updates the offset 30222A in the extent information 30222 to the destination logical block address.

Note that, although omitted in FIG. 13, when there is no free space in the corresponding virtual volume page, the file system program 3022 transmits an error message to the extent hierarchical management program 3025. In such a case, the extent hierarchical management program 3025 changes the virtual volume page to be the destination, and performs the processing from S1062 again.

The file system program 3022 releases the file access lock 30223 (S1066).

Then, the file system program 3022 transmits a response message to the extent hierarchical management program 3025 (S1067).

The extent hierarchical management program 3025 returns to S1061, when there is an extent left to be moved, and otherwise terminates the extent movement processing (S1068).

Figure 14:
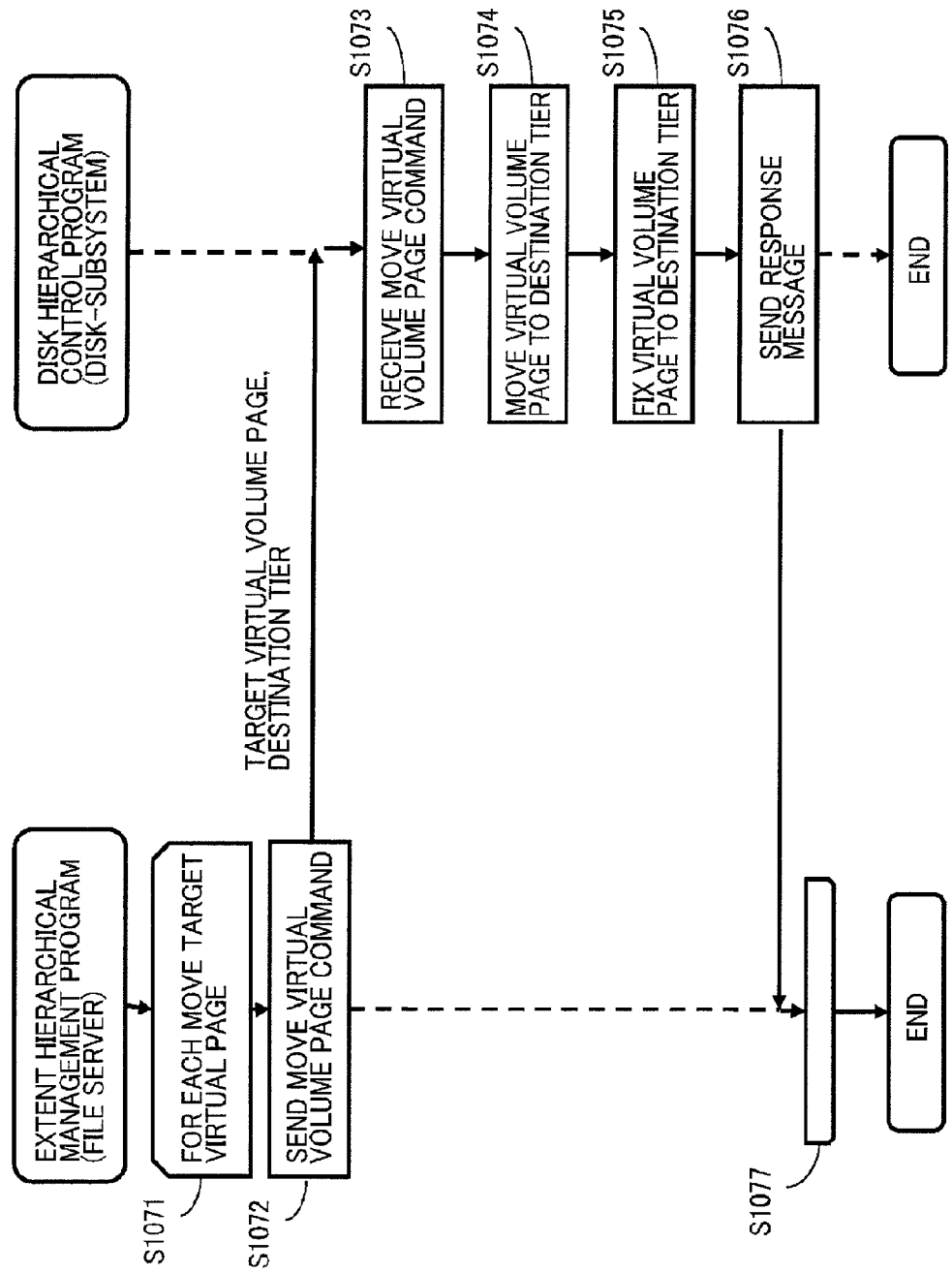
FIG. 14 is a flowchart of virtual page movement processing in the extent hierarchical management of the first embodiment.

FIG. 14 is a flowchart showing operations of the extent hierarchical management program 3025 and the disk hierarchical control program 4022 in virtual volume page movement processing. In the virtual volume page movement processing, the extent hierarchical management program 3025 instructs the disk hierarchical control program 4022 to move the virtual volume page having the extents consolidated in S106 to the tier specified for the virtual volume page.

The extent hierarchical management program 3025 performs a process in S1072 for each virtual volume page having the extents consolidated, which are extracted in S106 and are movement targets (S1071).

The extent hierarchical management program 3025 sends a move virtual volume page command to the disk hierarchical control program 4022 (S1072). The move virtual volume page command has the virtual volume page number 4031A and the destination tier 3031F, for example, as arguments.

The disk hierarchical control program 4022 receives the move virtual volume page command (S1073).

The disk hierarchical control program 4022 moves the virtual volume page in processing to the destination tier 3031F (S1074).

Then, the disk hierarchical control program 4022 excludes the virtual volume page in processing from the hierarchical control target, and fixes the virtual volume page in the destination tier (S1075).

Thereafter, the disk hierarchical control program 4022 transmits a response message to the extent hierarchical management program 3025 (S1076).

Subsequently, the disk hierarchical control program 4022 continues to perform the processes after S1072 when there is a virtual volume page left to be moved to a different tier, and otherwise terminates the virtual volume page move processing (S1077).

Figure 15:
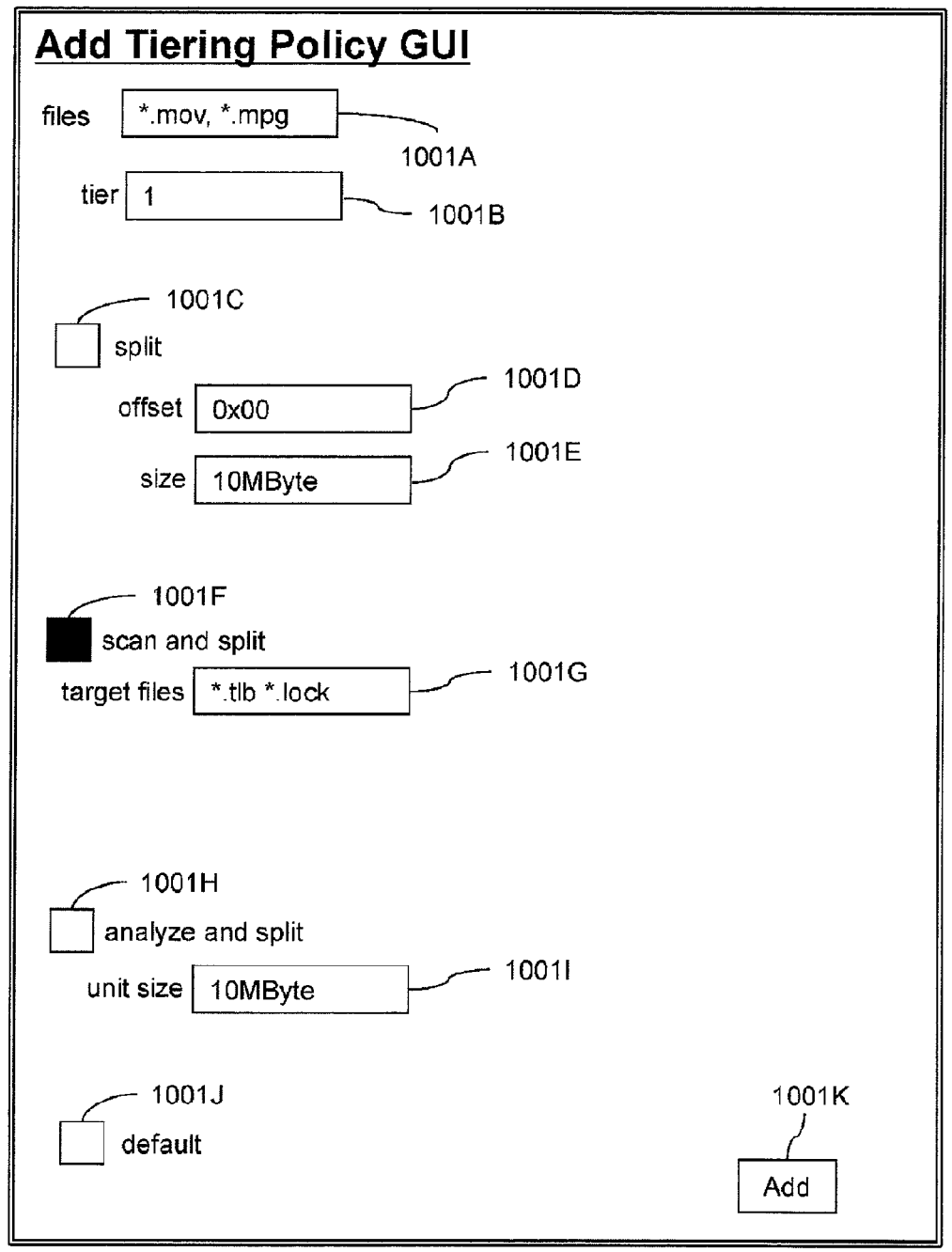
FIG. 15 is an image diagram showing a user interface for registering an extent hierarchical management policy of the first embodiment.

FIG. 15 is an image diagram showing a user interface for registering an extent hierarchical management policy.

This user interface is provided to the administrator by the management GUI program 1001, and is used to set the extent hierarchical management policy.

1001A denotes an input box for specifying a target file 3031A for which the extent hierarchical management policy is to be set.

1001B denotes an input box for specifying the destination tier 3031F.

1001C denotes a check box for setting "split" as the processing method 3031B. When the check box 1001B is activated, 1001F, 1001H and 1001J are deactivated.

1001D denotes an input box for inputting the offset of the target data block 3031D.

1001E denotes an input box for inputting the size of the target data block 3031D.

1001F denotes a check box for setting "scan and split" as the processing method 3031B. When the check box 1001F is activated, 1001C, 1001H and 1001J are de-activated.

1001G denotes an input box for inputting the scan target file 3031C.

1001H denotes a check box for setting "analyze and split" as the processing method 3031B. When the check box 1001H is activated, 1001C and 1001F are deactivated.

1001I denotes an input box for inputting the unit size 3031E.

1001J denotes a check box for setting "default" as the processing method 3031B. When the check box 1001J is activated, 1001C, 1001H and 1001F are deactivated.

1001K denotes a button for reflecting the input contents to the extent hierarchical management policy table 3031.

As described above, according to the present embodiment, appropriate control of data blocks and data block groups inside a file can be performed.

Moreover, in the present embodiment, the file system program 3022 in the file server 300 provides an upper program with an interface for creating and moving the extent.

This allows the extent hierarchical management program 3025 to change the configuration of the extent or to move extents in units of extents to a different tier. Moreover, a data area in a file can be moved to a different tier without constraints of file size and virtual volume page size.

Thus, unnecessary capacity consumption can be prevented, which is caused by movement of the whole file or whole virtual volume page when the inter tier movement is performed in units of files or virtual volume pages.

——Second Embodiment——

(2-1) Configuration of Second Embodiment

<Overall Configuration and Hardware Configuration>

Since the configurations of the information processing system and hardware in the second embodiment are same as those of the first embodiment, description thereof is omitted.

<Software Configuration>

Figure 16:
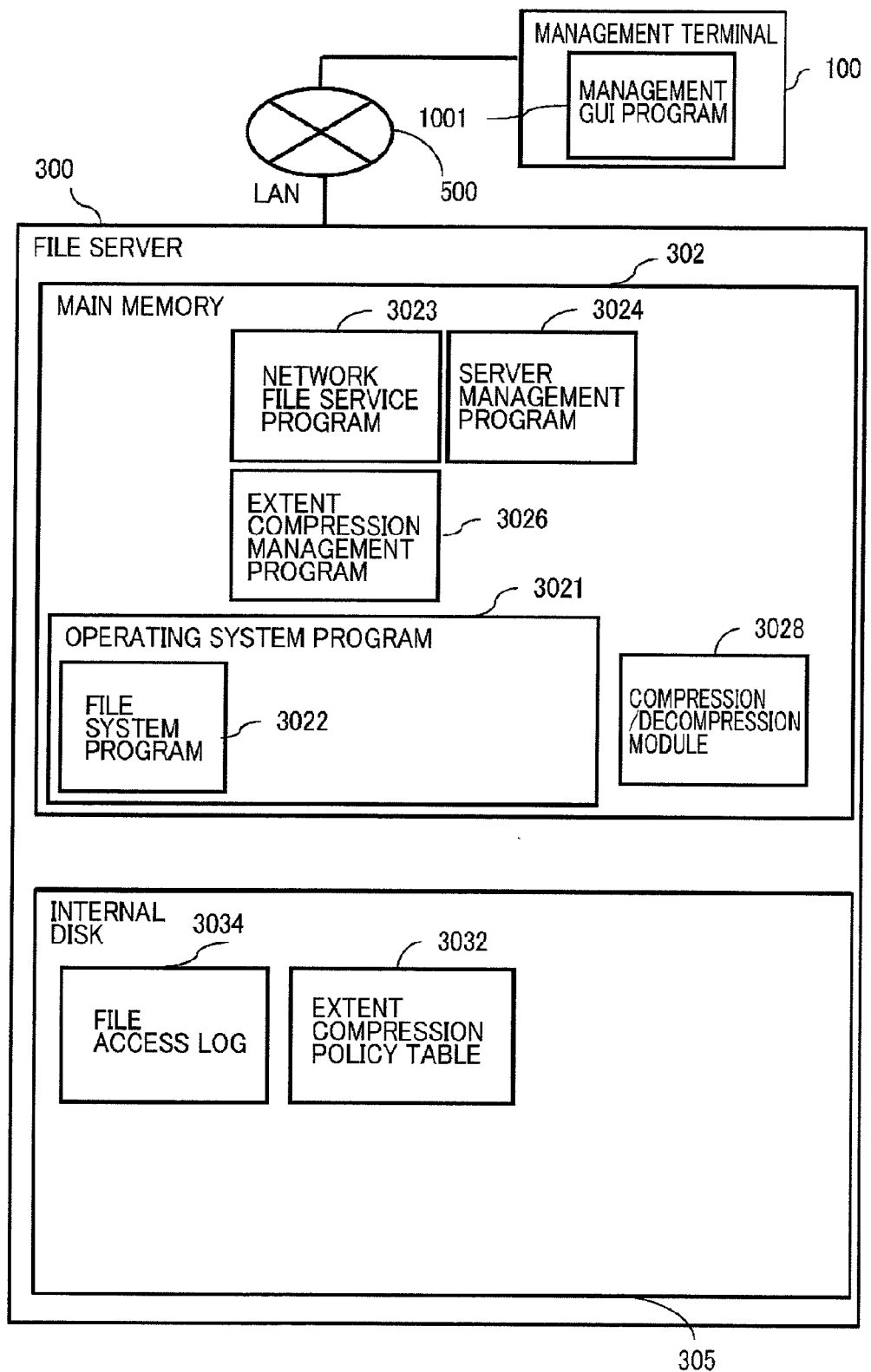
FIG. 16 is a block diagram showing a software configuration of a file server of the second embodiment.

FIG. 16 is a block diagram showing a software configuration of the file server 300 according to the second embodiment.

The file server 300 executes operating system program 3021, file system program 3022, network file service program 3023, file server management program 3024, extent compression management program 3026, and compression/decompression module 3028. The file server 300 also stores an extent compression policy table 3032 and a file access log 3034.

Note that the file system program 3022 is included in the operating system program 3021 in this embodiment.

The file system program 3022 implements functions as a file system. Moreover, the file system program 3022 according to the present embodiment has a data compression function in units of extents. The extent compression here is processing of compressing, in units of extents, data blocks in a file and storing the compressed extent in a disk.

Upon receipt of a read command or a write command for the compressed extent from the client server 200, the file system program 3022 decompresses the compressed extent in the main memory 302 and then returns a response to the client server 200. An operation when the file system program 3022 having the extent compression function receives the read command or write command is described in detail with reference to FIGS. 20 and 21.

The extent compression management program 3026 is a program for extracting a compression-exempt data block from a file managed by the file system program 3022 by referring to the extent compression policy table 3032, and instructing the file system program 3022 to create an extent and to change a flag.

Moreover, the extent compression management program 3026 instructs the file system program 3022 to create a new extent for the compression-exempt data block, to set a flag, and to perform compression processing. The extent compression management program 3026 is described in detail later with reference to FIGS. 22 to 24.

The compression/decompression module 3028 is a module to be invoked and executed by the file system program 3022 during compression or decompression of the file.

The internal disk 305 includes the extent compression policy table 3032. The extent compression policy table 3032 stores the extent compression policy settings set by the administrator.

The extent compression policy table 3032 is described later with reference to FIG. 17. The file server 300 may or may not have software modules such as programs, modules and tables related to the extent hierarchical management described in the first embodiment. The other software modules are the same as those in the first embodiment, and thus description thereof is omitted.

The disk-subsystem 400 may or may not have a disk hierarchical control function. The other components are the same as those in the first embodiment, and thus description thereof is omitted.

Note that the CPU 301 of the file server 300 implements various functions of the file server 300 according to the present embodiment by reading into the main memory 302 various programs stored in the internal disk 305 and executing those programs.

(2-2) Outline of Second Embodiment

The file system program 3022 having the extent compression function according to the present embodiment provides the upper program with an interface for creating an extent, specifying compressibility, and executing compression processing.

This allows the extent compression management program 3026 to create a compression-exempt extent target and to set a flag according to the extent compression policy table 3032 specified by the administrator.

Thus, when there are data blocks with low compression efficiency in a portion of the file, for example, when the file server 300 performs compression processing on the file stored in the storage device 410, that portions are excluded from the compression processing target, and thus the overhead time required for the compression/decompression processing can be reduced.

Meanwhile, when there are data blocks with high performance requirements (for example, access frequency) in a portion of the file, that portion is excluded from the compression processing target, and thus increase in response time during reading of the file can be prevented.

According to the present embodiment, the overhead of the compression/decompression processing can be reduced by performing no compression processing for the data blocks with low compression efficiency, and increase in access response time due to decompression processing can be prevented by performing no compression for the data blocks with high performance requirements.

As described above, the file server 300 according to the present embodiment enables data compression to be performed according to the file contents.

Note that while the extent compression management program 3026 manages the extents in the present embodiment, this is merely an example. Alternatively, a user program on the file server 300 or a program on the client server 200 may perform extent management for the file in use.

Moreover, for example, a control can be performed to set only portions of the file to be the compression target, besides the control to exempt only portions of the file from the compression target.

Figure 17:
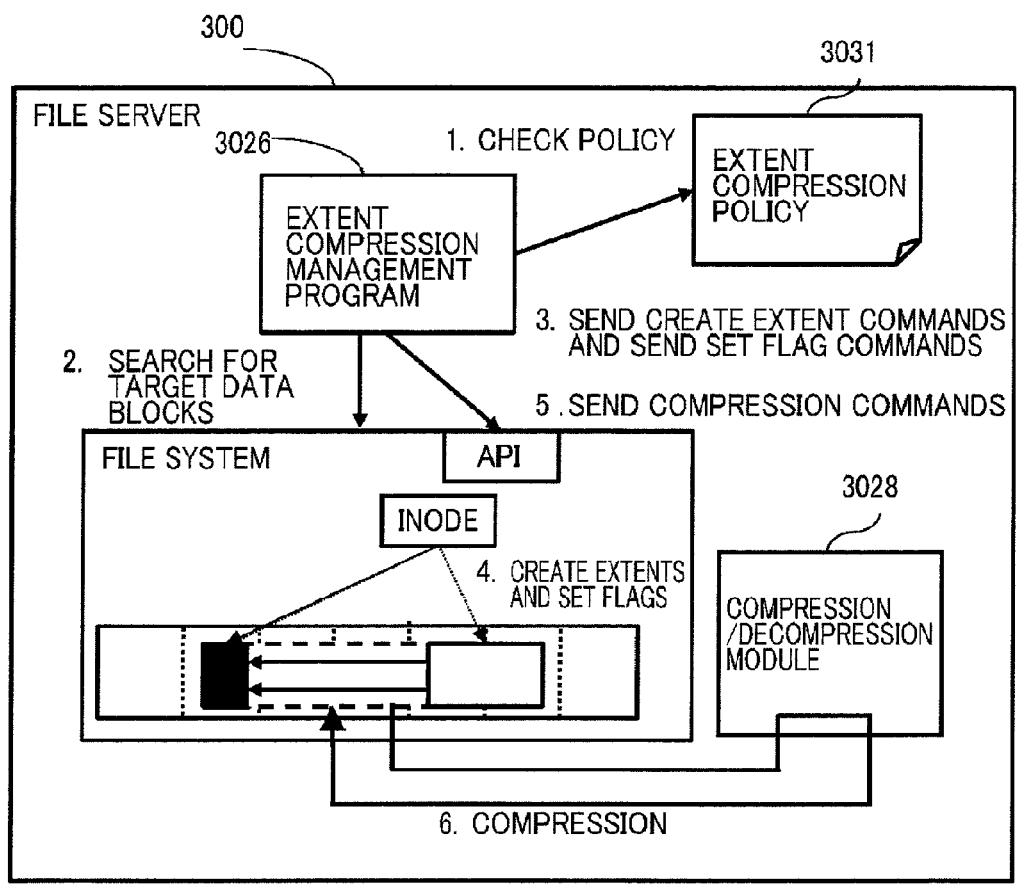
FIG. 17 is an explanatory diagram showing an outline of the second embodiment.

With reference to FIG. 17, a flow of the series of processing is described.

FIG. 17 is an explanatory diagram showing an outline of processing contents when the extent compression management program 3026 performs extent compression processing. Note that, in the present embodiment, the file server 300 once stores a file in an uncompressed state when storing the file in the storage device 410, and after elapse of a predetermined period, the file system program 3022 performs the compression processing according to the present embodiment under the instruction of the extent compression management program 3026.

The extent compression management program 3026 running on the file server 300 refers to the extent compression policy table 3032 set by the administrator, and checks an extent compression processing method for each file (corresponding to "1" in FIG. 17)

In the extent compression policy table 3032, policies are specified, such as excluding from the compression target a portion with high performance requirements of a file in which the portion with high performance requirements is located at a fixed position, extracting a storage location of a file with low compression efficiency from an image file and excluding the file from the compression target, and excluding a frequently-accessed data block in a specified file from the compression target.

The extent compression management program 3026 accesses the file system program 3022, and extracts a data block set to be the compression-exempt target from the file after the predetermined period has passed since storage (corresponding to "2" in FIG. 17).

The extent compression management program 3026 transmits a create extent command for a data block to be excluded from the compression target and a set flag command to set a compression execute flag to 0 through the interface of the file system program 3022 (corresponding to "3" in FIG. 17). Note that a system call is favorable as the interface here.

Upon receipt of the commands, the file system program 3022 creates a new extent for the specified data block and sets the compression execute flag to 0 (corresponding to "4" in FIG. 17).

The extent compression management program 3026 transmits a file compression command to the file system program 3022 (corresponding to "5" in FIG. 17), and the file system program 3022 compresses the compression target extent (corresponding to "6" in FIG. 17).

As described above, in the present embodiment, after a predetermined period has elapsed since file storage, the extent compression management program 3026 extracts the compression-exempt target data block from the compression target file, and performs compression processing. However, this is merely an example.

Alternatively, the data compression program may extract a data block to be compressed and set the other data blocks as compression-exempt target. Moreover, files may be compressed and stored in the disk-subsystem 400 when storing the files, and data blocks not to be compressed may be decompressed later.

(2-3) Example of Second Embodiment

The file system program 3022 according to the second embodiment provides a user interface for setting the extent compression policy table 3032. Since implementation of the interface is the same as that of the interface shown in FIG. 15 except that the input box 1001B is not included therein, detailed description is omitted.

FIG. 18 is an explanatory diagram showing an extent extended property table 30222C according to the second embodiment.

In the extent extended property table 30222C according to the second embodiment, "compression execute flag", "compressed size" and "compressed flag" can be specified as the properties 30222C1.

"Compression execute flag" has a flag indicating compressibility of an extent as the property value 30222C2. Upon receipt of the compression command from the upper program, the file system program 3022 compresses the extent for which the flag indicating the compressibility is 1, and does not compress the extent for which the flag is 0.

"Compressed size" has an actual size of the compressed extent as the property value 30222C2.

"Compressed flag" has a property value indicating whether or not the extent is compressed. The extent is compressed when the compressed flag is 1, and the extent is not compressed when the compressed flag is 0.

FIG. 19 is an explanatory diagram showing the extent compression policy table 3032.

The extent compression policy table 3032 has columns for target file 3032A to be a policy target, processing method 3032B, scan target file 3032C, target data block 3032D and unit size 3032E.

The target file 3032A indicates a file name or directory name to be a policy target. The file name or directory name can also be specified by path notation using a regular expression. The regular expression is a method of expressing a set of texts with a single text.

When "default" meaning default processing is set in the target file 3032A, all the files for which no policies are individually set are the policy targets.

In processing method 3032B, a method for extracting a compression-exempt data block from the target file 3032A is set. As processing method 3032B, any of the following four types can be specified: "split", "scan and split", "analyze and split", and "none".

When "split" is specified, a data block stored in a specified position is set as a compression-exempt target. When "scan and split" is specified, a data block having a specific file stored therein is extracted from virtual files obtained by connecting a plurality of files such as image files, and the data block is set as a compression-exempt target.

When "analyze and split" is specified, the file access log 3034 is analyzed, and a frequently-accessed portion in the file is specified and set as a compression-exempt target. When "none" is specified, no compression-exempt processing is performed.

In the scan target file 3032C, a file name of a loop-back device file as a compression-exempt target or a file name in a connected file is specified when "scan and split" is specified in the processing method 3032B. Moreover, a folder name or a regular expression of the file may be specified, other than the file name, in the scan target file 3032C.

Note that the loop-back device described here is a device which stores virtual disk images in file format. As the loop-back device, a vmdk (virtual machine disk) file or an ISO file is favorable.

Moreover, the connected file is a file obtained by connecting a plurality of files into a single file. A tar file is favorable as the connected file.

In the target data block 3032D, the offset and size of a region to be a non-compression target are specified when "split" is set as the processing method.

In unit size 3032E, an access frequency analysis unit is specified when "analyze and split" is specified as the processing method. The extent compression management program 3026 calculates an access frequency for each region of the size specified in unit size 3032E, and calculates whether or not compression-exempt processing is required.

Figure 20:
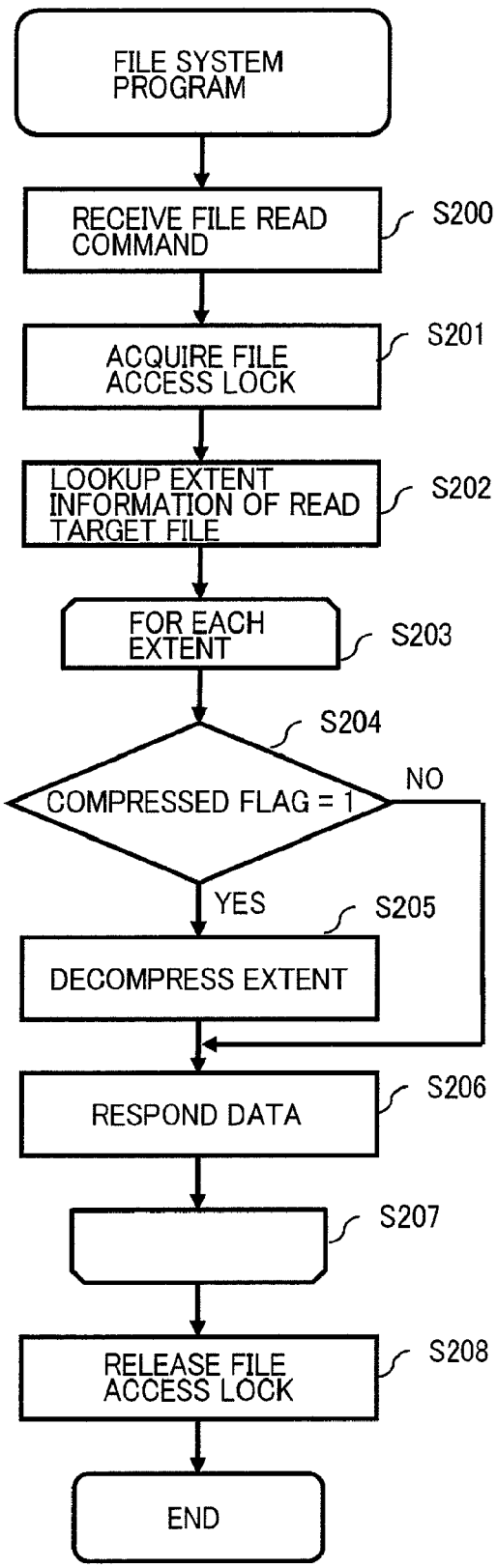
FIG. 20 is a flowchart showing read processing of a file system program according to the second embodiment.

FIG. 20 is a flowchart showing read processing performed by the file system program 3022 according to the second embodiment when the file server 300 receives a file read command from the client server 200.

Upon receipt of a read file command, the file system program 3022 according to the present embodiment checks whether or not the extent to be read is compressed, and performs decompression processing as needed.

The file system program 3022 receives a file read command from an upper program such as the network file service program 3023 (S200).

Then, the file system program 3022 acquires file access lock 30223 of the read target file (S201). If the file access lock 30223 is being used in another process and cannot be acquired, the file system program 3022 suspends the process until the file access lock 30223 can be acquired.

The file system program 3022 specifies a read target extent by checking the extent information 30222 on the read target file (S202).

The file system program 3022 performs the processes from S204 to S206 on all the read target extents specified in S202 (S203).

The file system program 3022, referring to the extent extended property table 30222C of the extent in processing, moves to S205 when the compressed flag is 1 and moves to S206 when the compressed flag is 0 (S204).

The file system program 3022 uses the compression/decompression module 3028 to decompress onto the memory the data block in the extent in processing (S205). Note that, although not shown in FIG. 20, the decompression processing is omitted when the read target extent is already held as a cache on the main memory 302.

Note that the cache here means frequently-used data stored in the high-speed main memory 302 for faster access.

The file system program 3022 returns the read target data block as a response to the upper program (S206).

The file system program 3022 continues to perform the processes from S203 when there is a read target extent left (S207).

The file system program 3022 releases the file access lock 30223 (S208).

Figure 21:
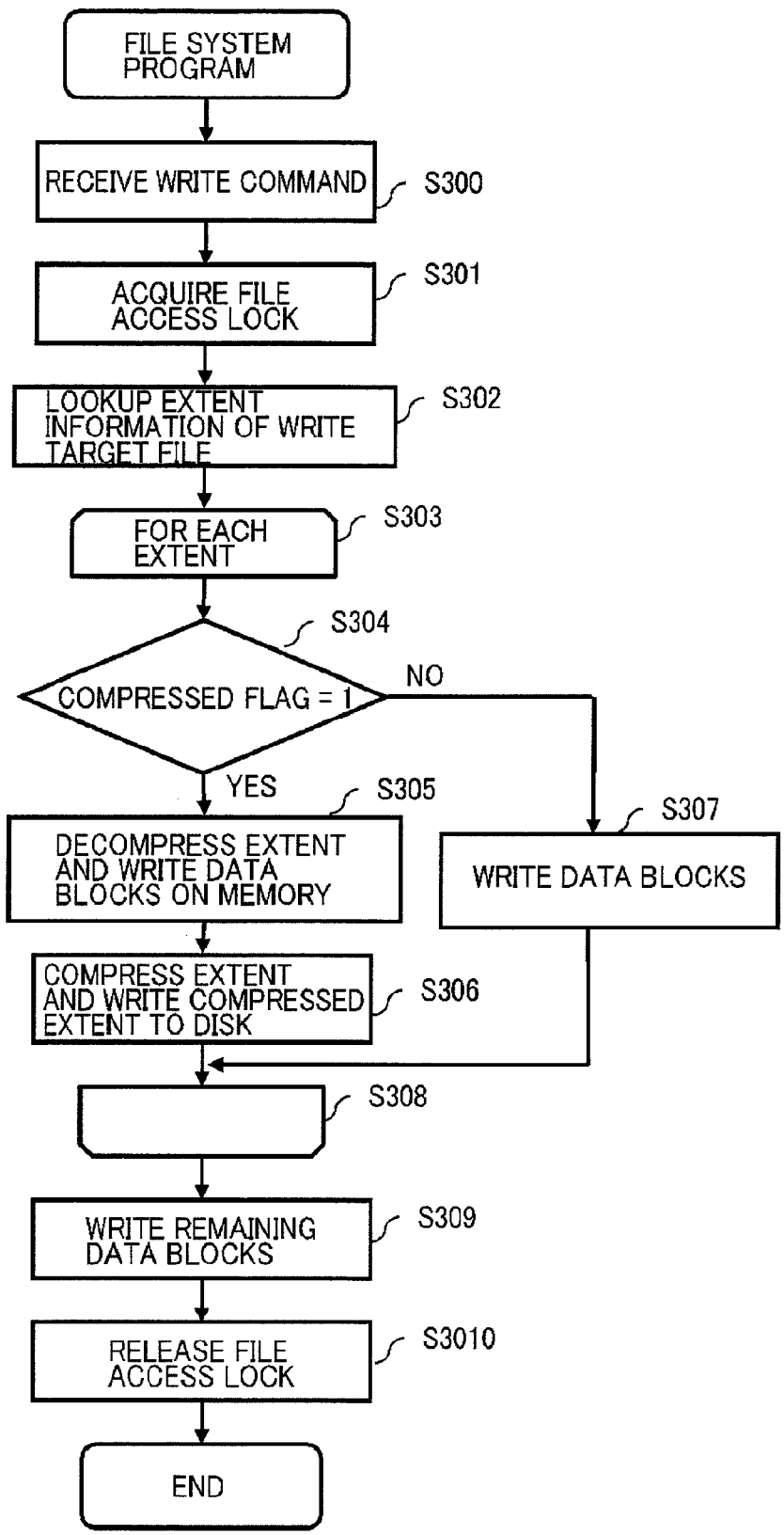
FIG. 21 is a flowchart showing write processing of the file system program according to the second embodiment.

FIG. 21 is a flowchart showing update processing performed by the file system program 3022 according to the second embodiment when the file server 300 receives a file update command from the client server 200.

Upon receipt of an file update command, the file system program 3022 according to the present embodiment checks if the update target extent is compressed, and performs decompression processing if required.

The file system program 3022 receives a write command from an upper program such as the network file service program 3023 (S300).

Then, the file system program 3022 acquires the file access lock 30223 of the update target file (S301). When the file access lock 30223 is being used in another process and cannot be acquired, the file system program 3022 suspends the process until the file access lock 30223 can be acquired.

The file system program 3022 specifies an update target extent by checking through the extent information 30222 on the update target file (S302). Note that, although not shown in FIG. 21, the file system program 3022 moves to S309 when the update command is an additional update for a new region.

The file system program 3022 performs the processes from S304 to S307 on all the update target extents specified in S302 (S303).

The file system program 3022, referring to the extent extended property table 30222C of the extent in processing, determines whether or not the compressed flag is 1, and moves to S305 when the compressed flag is 1 and moves to S307 when the compressed flag is 0 (S304).

The file system program 3022 uses the compression/decompression module 3028 to decompress onto the memory the data block in the extent in processing and writes the update data thereon (S305). Note that, although not shown in FIG. 21, the decompression processing is omitted when the extent in processing is left as a cache on the main memory 302.

The file system program 3022 uses the compression/decompression module 3028 to compress the extent data on the memory and write the compressed data into the disk (S306). In this event, the file system program 3022 updates the size of the property value 30222C2 in the extent information 30222. Further, when a continuous region on the disk cannot be secured from the original storage location for the compressed extent, the file system program 3022 assigns a new region to another region.

The file system program 3022 writes update data directly into the disk when the compressed flag is 0 in S304 (S307).

The file system program 3022 repeats the processes after S303 when there is an update target extent left, and otherwise moves to S309 (S308).

The file system program 3022 creates a new extent for the update data in the region other than the existing extent, and writes the extent into the disk (S309). Note that when the update target file is the already compressed file, the file system program 3022 also compresses and stores the newly created extent.

The file system program 3022 releases the file access lock 30223 (S3010).

Figure 22:
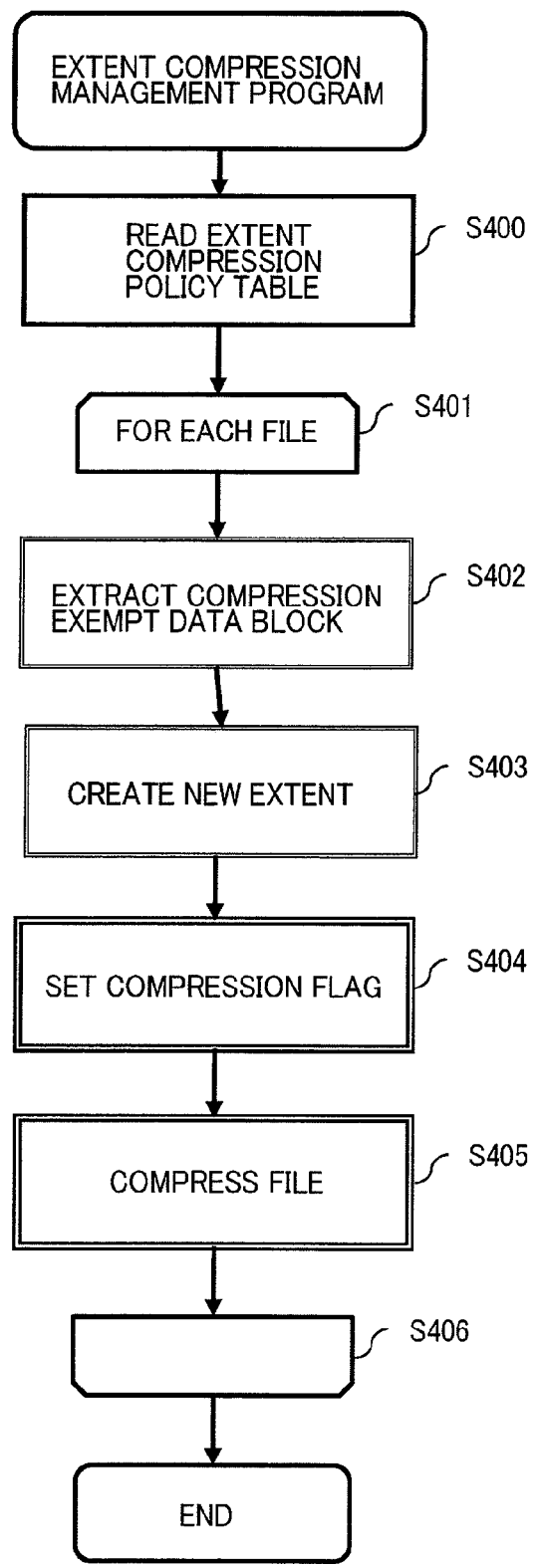
FIG. 22 is a flowchart of extent compression management processing of the second embodiment.

FIG. 22 is a flowchart showing operations of the extent compression management program 3026 in the extent compression management processing.

The extent compression management program 3026 performs file compression processing according to the contents set in the extent compression policy table 3032. Note that the processes in S402 and S403 are the same as those in S103 and S104 in FIG. 10. The processes in S404 and S405 are described later with reference to FIGS. 23 and 24.

The extent compression management program 3026 reads the extent compression policy table 3032 and acquires processing method 3032B for each file (S400).

The extent compression management program 3026 performs the processes from S402 to S405 for each file (S401).

The extent compression management program 3026 extracts from the file in processing a data block to be excluded from the compression target according to the processing method 3032B acquired in S400 (S402). Since this process is the same as S103, detailed description thereof is omitted.

The extent compression management program 3026 instructs the file system program 3022 to create a new extent for the data block extracted in S402 (S403). Since the extent create process is the same as S104, detailed description thereof is omitted.

The extent compression management program 3026 instructs the file system program 3022 to set the compression execute flag to 0 for the extent created in S403 (S404). This process is described in detail with reference to FIG. 23.

The extent compression management program 3026 instructs the file system program 3022 to compress the file in processing (S405). This process is described in detail with reference to FIG. 24.

The extent compression management program 3026 repeats the processes after S401 when there is a file left to be processed, and otherwise terminates the extent compression processing (S406).

Figure 23:
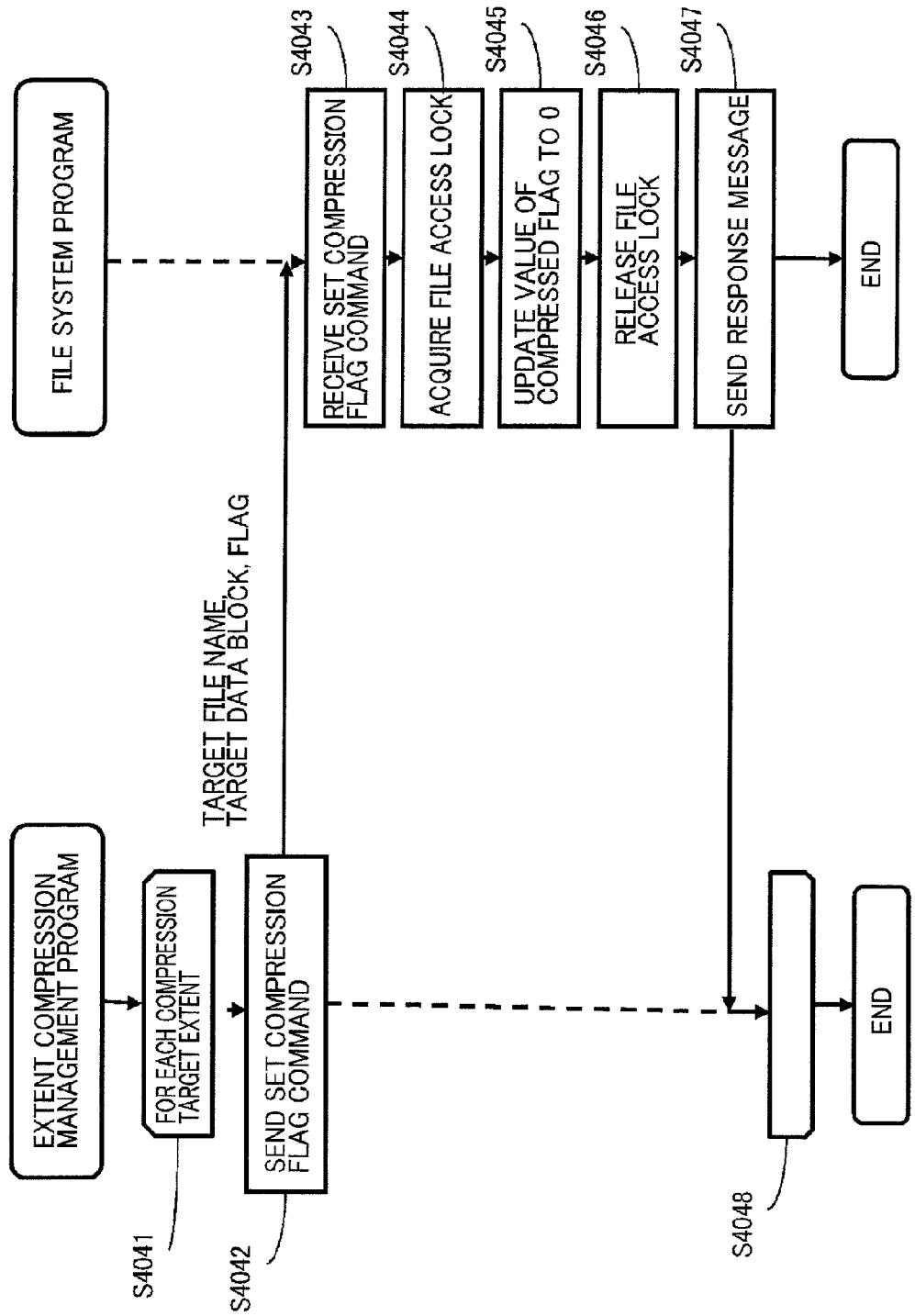
FIG. 23 is a flowchart of compression property setting processing of an extent of the second embodiment.

FIG. 23 is a flowchart showing operations of the extent compression management program 3026 and the file system program 3022 in the extent property setting processing in S404 shown in FIG. 22.

The extent compression management program 3026 performs a process in S4042 on all the extents created in S403 (S4041).

The extent compression management program 3026 transmits a set compression execute flag command to the file system program 3022 (S4042). As arguments of this command, for example, a file name, a target data block offset and a flag value of 0 are specified.

The file system program 3022 receives a set flag command (S4043).

The file system program 3022 acquires the file access lock 30223 of the file specified by the set flag command (S4044). If the file access lock 30223 is being used in another process and cannot be acquired, the file system program 3022 suspends the process until the file access lock 30223 can be acquired.

The file system program 3022 updates the value of the compression execute flag of the extent at the location specified by the set compression flag command to 0 (S4045). The file system program 3022 releases the file access lock 30223 (S4046).

Then, the file system program 3022 returns a response message to the extent compression management program 3026 (S4047).

The extent compression management program 3026 repeats the processes after S4041 if there is any compression-exempt target extent, and otherwise terminates the extent property setting completion process (S4048).

Figure 24:
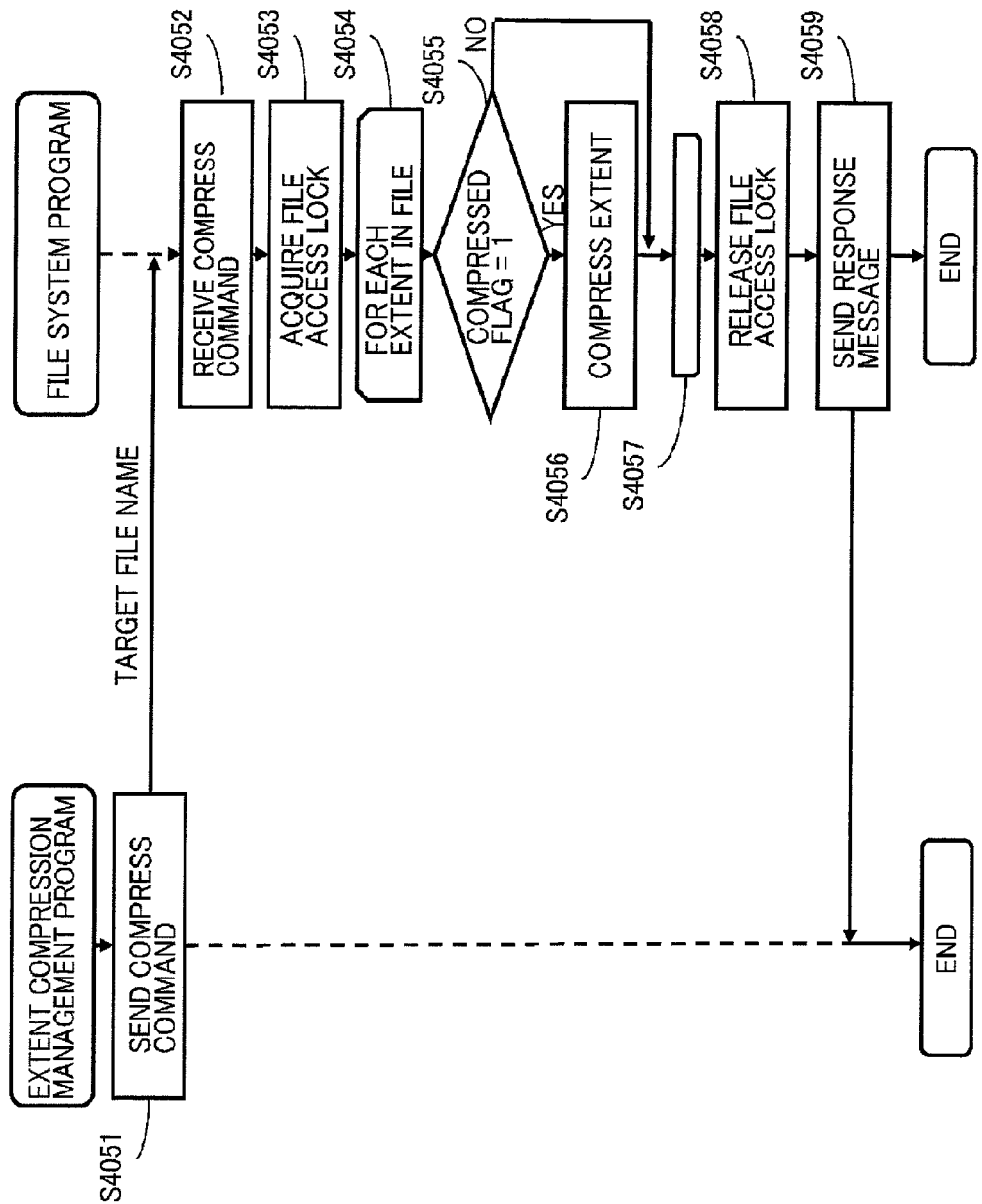
FIG. 24 is a flowchart of extent compression processing of the second embodiment.

FIG. 24 is a flowchart showing operations of the extent compression management program 3026 and the file system program 3022 in the compression processing in S405 shown in FIG. 22.

The extent compression management program 3026 transmits a compress command to the file system program 3022 (S4051). The compress command has a file name, for example, as the argument.

The file system program 3022 receives the compress command (S4052).

The file system program 3022 acquires the file access lock 30223 of the file specified by the compress command (S4053). When the file access lock 30223 is being used in another process and cannot be acquired, the file system program 3022 suspends the process until the file access lock 30223 can be acquired.

The file system program 3022 performs the processes in S4055 and S4056 on all the extents included in the file in processing (S4054).

The file system program 3022 examines the extent extended property table 30222C to check if the compression flag in processing is 1 (S4055). The process moves to S4056 if the flag is 1, and otherwise moves to S4057.

The file system program 3022 uses the compression/decompression module 3028 to compress the extent in processing (S4056). Note that, although not shown in FIG. 24, the compression process is omitted if the extent in processing is already compressed. After the compression process, the file system program 3022 updates the offset 30222A and the size 30222B in the extent information 30222 as well as the compressed flag and the compressed size.

The file system program 3022 returns to S4054 to continue the process when there is an extent left to be processed (S4057), and otherwise moves to S4058.

The file system program 3022 releases the file access lock 30223 (S4058).

The file system program 3022 returns a response message to the extent compression management program 3026 (S4059).

Thus, according to the present embodiment, appropriate control of data blocks and data block groups inside a file can be performed.

Moreover, according to the present embodiment, the extent compression management program 3026 can create a compression-exempt target extent and set a flag according to the extent compression policy table 3032 set by the administrator.

Accordingly, when there are data blocks with low compression efficiency in a portion of the file, for example, when the file server 300 performs compression processing on the file stored in the storage device 410, that portions are excluded from the compression process target, and thus the overhead time required for the compression/decompression processing can be reduced.

Meanwhile, when there are data blocks with high performance requirements in a portion of the file, that portion is excluded from the compression process target, and thus increase in response time during reading of the file can be prevented.

According to the present embodiment, the overhead of the compression/decompression processing can be reduced by performing no compression processing for the data blocks with low compression efficiency, and increase in access response time due to decompression processing can be prevented by performing no compression for the data blocks with high performance requirements.

As described above, the file server 300 according to the present embodiment enables data compression to be performed according to the file contents.

——Third Embodiment——

(3-1) Configuration of Third Embodiment

<Overall Configuration and Hardware Configuration>

Since configurations of the information processing system and hardware in the third embodiment are the same as those of the first embodiment, detailed description thereof is omitted.

<Software Configuration>

Figure 25:
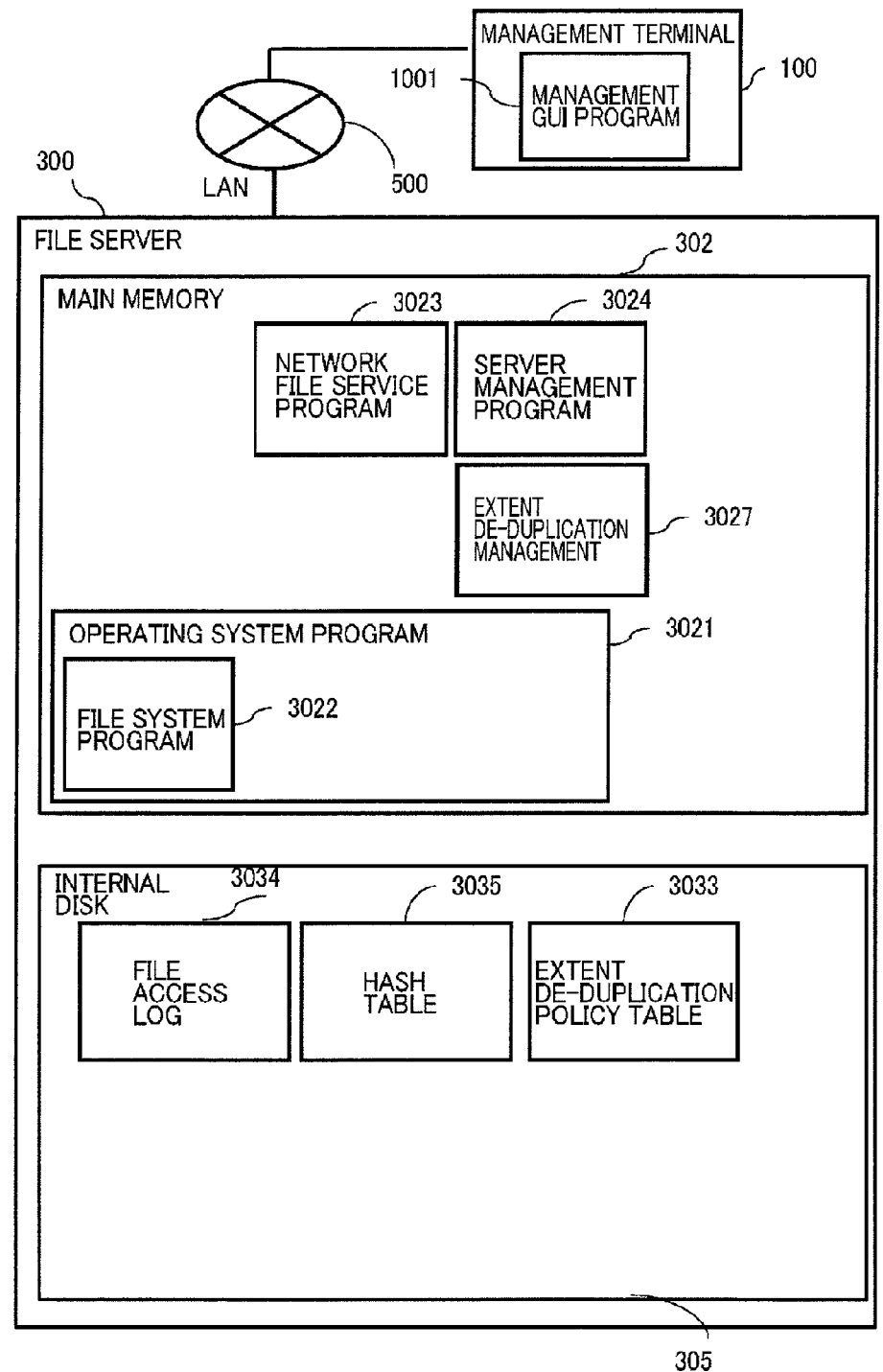
FIG. 25 is a block diagram showing a software configuration of a file server of the third embodiment.

FIG. 25 is a block diagram showing a software configuration of the file server 300 according to the third embodiment.

The file server 300 executes operating system program 3021, file system program 3022, network file service program 3023, file server management program 3024, and extent de-duplication management program 3027. The file server 300 also stores de-duplication policy table 3033, hash table 3035 and file access log 3034.

Note that the file system program 3022 is included in the operating system program 3021 in the present embodiment.

The file system program 3022 implements functions as a file system. Moreover, the file system program 3022 according to the present embodiment has a function to split a file into extents and eliminate duplication between the extents (hereinafter referred to as the extent de-duplication function).

The function to eliminate duplication between the extents is a function of the file system program 3022 where, when there are two or more extents having data with the same hash value in the file system, only one of the extents remains and the others deleted, and refers to the remaining extent when reference to the deleted extent is needed.

The other extent having the same data shares one of the extents stored in the disk-subsystem 400. The extent de-duplication management program 3027 is a program for extracting a data block to be adjusted for its location for de-duplication of the file as well as a data block not to be subjected to the de-duplication, and instructing the file system program 3022 to adjust the location of the extent and to change the flag.

The de-duplication policy table 3033 is a table storing extent de-duplication policy settings set by the administrator, and is described later with reference to FIG. 29.

The hash table 3035 is a hash table for checking the correlation between a hash value and an extent. The hash table here is a data structure which stores pairs of keys and values and enables fast look-up of a certain value corresponding to a certain key.

The file server 300 may or may not have a module related to the extent hierarchical management described in the first embodiment. Also, the file server 300 may or may not have a module related to the compression management described in the second embodiment. The other modules are the same as those in the first and second embodiments, and thus description thereof is omitted.

The disk-subsystem 400 may or may not have a disk hierarchical control function. The other components are the same as those in the first embodiment, and thus description thereof is omitted.

Note that the CPU 301 of the file server 300 implements various functions of the file server 300 according to the present embodiment by reading into the main memory 302 various programs stored in the internal disk 305 and executing those programs.

(3-2) Outline of Third Embodiment

The file system program 3022 having extent de-duplication function according to the present embodiment provides an upper program with an interface for adjusting the location of an extent and specifying whether or not de-duplication is to be performed.

This allows split data to be arranged so that de-duplication process is effectively performed. Moreover, a portion with high performance requirements can be set not to be subjected to the de-duplication.

The extent de-duplication management program 3027 according to the present embodiment instructs the file system program 3022 to adjust the location of the extent so as to increase de-duplication efficiency, according to the extent de-duplication policy table 3033 specified by the administrator.

The extent location adjustment here means re-splitting a specified region in a file by a unit size extent with fixed-length.

For example, the extent de-duplication management program 3027 performs extent location adjustment between first and second files specified by the user.

Moreover, the file server 300 according to this embodiment can receive specification of the split method for de-duplication from the upper program, and thus can change the split method according to the data arrangement in the file.

Thus, the extent location adjustment can be performed so as to improve the de-duplication ratio. As a result, the de-duplication effect can be increased.

Moreover, an extent having a reference frequency higher than a threshold value is excluded from the de-duplication target, and thus the data block being the access target can be dispersed. Thus, the performance can be improved.

As a concrete example, improvement in de-duplication efficiency can be expected by aligning with each file the adjusted extent location in a connected file obtained by connecting a plurality of files. Moreover, a frequently-accessed region of a clone file of a virtual machine image having many duplicated extents is excluded from the de-duplication target. Thus, improvement in access performance can be expected.

The clone file here means a file which is obtained by cloning a certain file and setting it in an updatable state.

Figure 26:
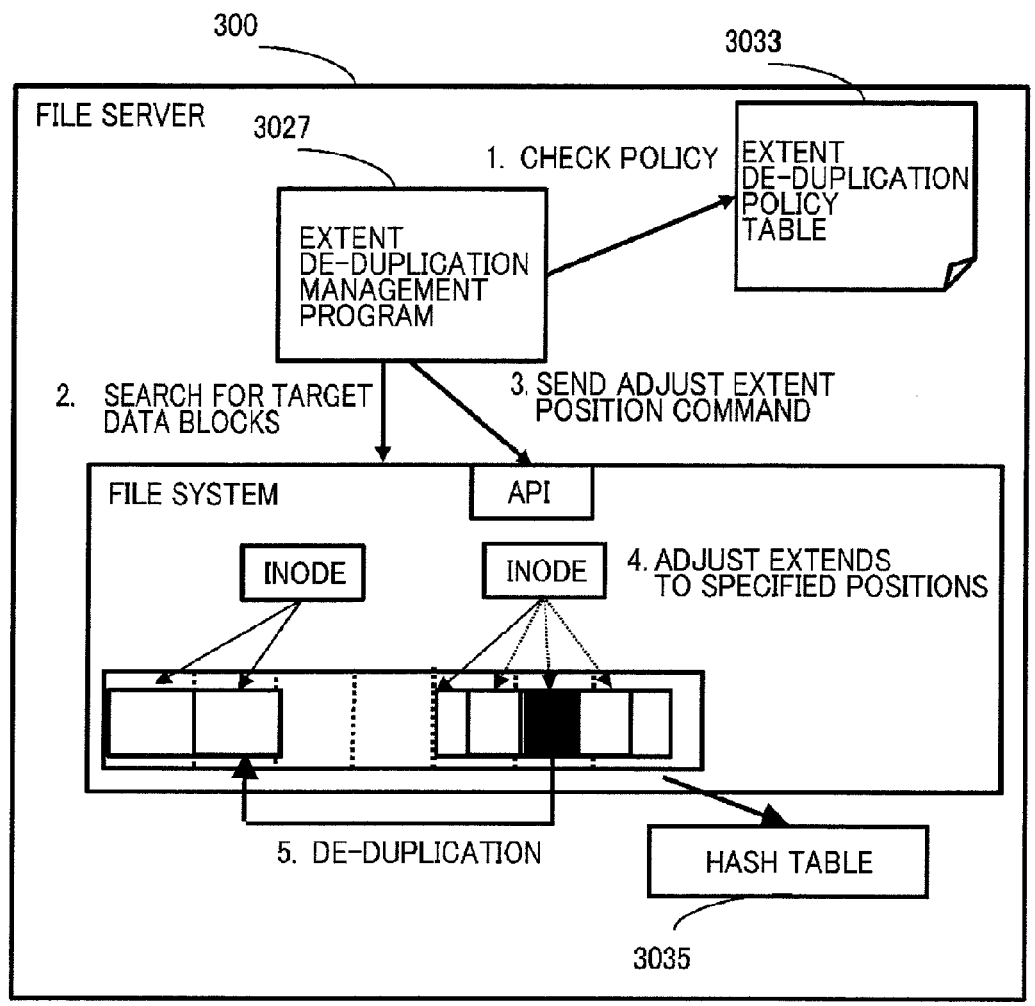
FIG. 26 is an explanatory diagram showing an outline of the third embodiment.

With reference to FIG. 26, a flow of the series of processing is described.

FIG. 26 is an explanatory diagram showing an outline of the extent de-duplication processing by the extent de-duplication management program 3027.

Note that, in the present embodiment, data stored in the file server 300 is temporarily stored in the disk-subsystem 400 without being subjected to de-duplication. After the elapse of a predetermined period of time, the file system program 3022 performs the de-duplication processing according to the instruction of the extent de-duplication management program 3027.

The extent de-duplication management program 3027 running on the file server 300, refers to the extent de-duplication policy table 3033 set by the administrator, checks the extent de-duplication processing method for each file (corresponding to "1" in FIG. 26).

The de-duplication policy table 3033 includes information specifying an extent split position for the file for which a split position to achieve a large de-duplication effect is previously known, information specifying an extent split position in determining a de-duplication position according to the arrangement of the files in the image file, and information specifying an extent split position in excluding the frequently-accessed region in the specified file from the de-duplication target.

The extent de-duplication management program 3027 accesses the file system program 3022 and extracts a data block to be a de-duplication target from the file that have been stored for a predetermined period (corresponding to "2" in FIG. 26).

The extent de-duplication management program 3027 transmits an adjust extent-position command for the corresponding data region through the interface of the file system program 3022 (corresponding to "3" in FIG. 26). Note that a system call is favorable as the interface here.

Upon receipt of the above command, the file system program 3022 adjusts the extent location to the specified arrangement (corresponding to "4" in FIG. 26), and performs the de-duplication processing (corresponding to "5" in FIG. 26).

Although the extent de-duplication management program 3027 adjusts the extent location and specifies whether or not to perform the de-duplication in the present embodiment as described above, this is merely an example. Another user process in the file server 300 or a program on the client server 200 may perform a similar processing for the file in use.

Moreover, the execution of de-duplication after a certain period of time has elapsed after file storage is also just an example. De-duplication may be performed during the file storage and the split position adjustment may be performed later.

(3-3) Example of Third Embodiment

FIG. 27 is an explanatory diagram showing an extent extended property table 30222C.

The extent extended property table 30222C according to the third embodiment includes "de-dup flag", "de-duped flag", "post de-dup destination" and "de-dup counter" as properties 30222C1.

"De-dup flag" is a flag indicating whether or not an extent is set to be a de-duplication target. The extent is set to be a de-duplication target when the flag is 1, and is not set to be a de-duplication target when the flag is 0.

"De-duped flag" indicates whether or not the extent is de-duplicated for another extent having the same hash value. The extent is de-duplicated when "de-duped flag" is 1, and is not de-duplicated when "de-duped flag" is 0.

"Post de-dup destination" is a property owned by only the de-duplicated extent and has, as the property value, a logical block address of the post de-duplication destination extent having the same hash value.

"De-dup counter" is a property owned by only the extent set to be the post de-duplication destination of another extent, and has, as the property value, the number of de-duplicated extents.

FIG. 28 is an explanatory diagram showing the extent de-duplication policy table 3033.

The extent de-duplication policy table 3033 has target file 3033A, processing method 3033B, unit size 3033C, target region 3033D and de-dup flag 3033E, The target file 3033A specifies the file name to be the de-duplication target. In target file 3033A, a directory name may be specified, or a regular expression may be specified as the file name.

When "default" is set in target file 3033A, all the files for which no policies are set are the policy targets.

In processing method 3033B, an extent de-duplication method for a file is set. As processing method 3033B, "adjust extent position", "scan and split", "analyze and stop", or "none" is set.

When "adjust extent position" is set, the extent de-duplication management program 3027 instructs the file system program 3022 to split the region specified in the target region 3033D by the size specified in unit size 3033C.

When "scan and split" is set, the extent de-duplication management program 3027 mounts or scans the target file, and adjusts the extent position for each of the storage positions of the files included in the target file.

When "analyze and stop" is set, the extent de-duplication management program 3027 analyzes the file access log 3034 and excludes the frequently-referred data region from the de-duplication target.

When "none" is specified, the extent de-duplication management program 3027 performs nothing in particular.

The unit size 3033C specifies the split size of an extent.

The target region 3033D specifies a target region on which extent position adjustment is performed, the target region being specified when "adjust extent position" is set in the processing method 3033B.

Figure 29:
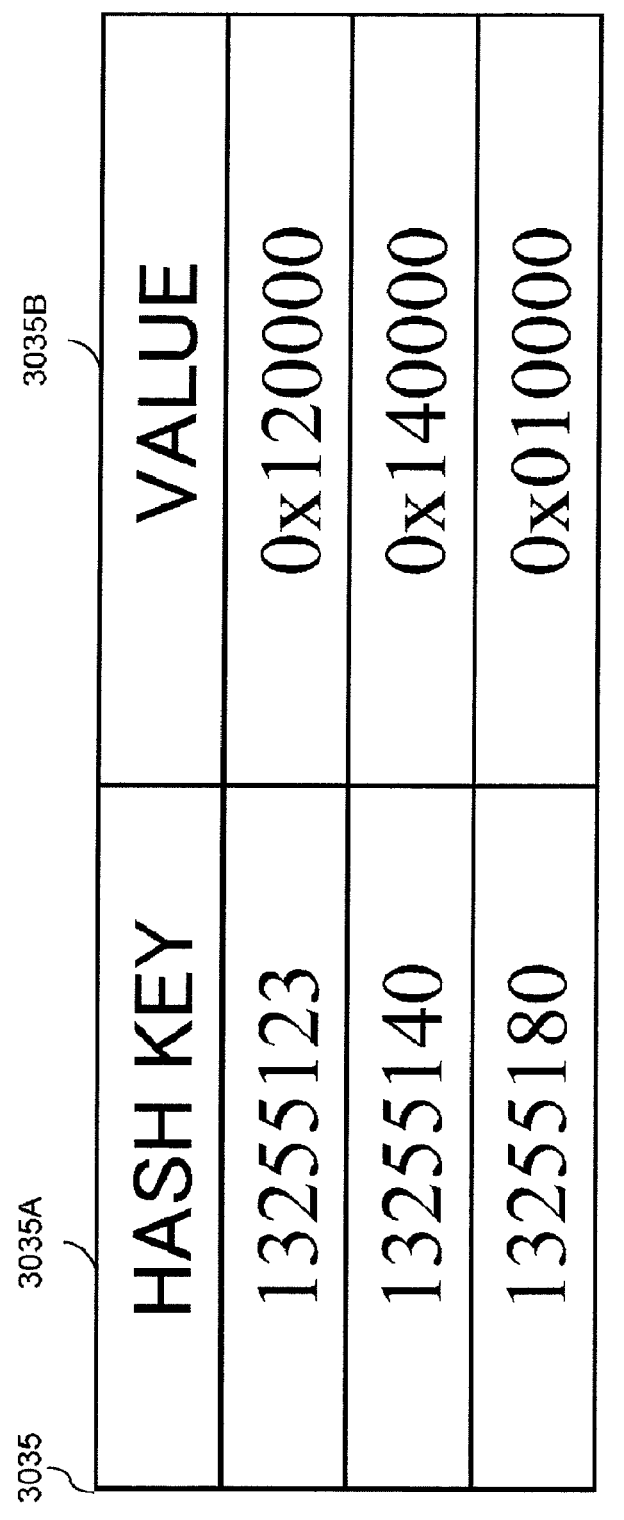

FIG. 29 is an explanatory diagram showing the structure of the hash table 3035.

The hash table 3035 includes "hash key" 3035A and "value" 3035B.

The "hash key" 3035A is a value obtained by calculating the hash value of a data block included in an extent. The hash value here means a pseudorandom number calculated from the extent data.

The "value" 3035B means a logical block address of the extent information 30222 on one or more extents having "hash key" 3035A.

Figure 30:
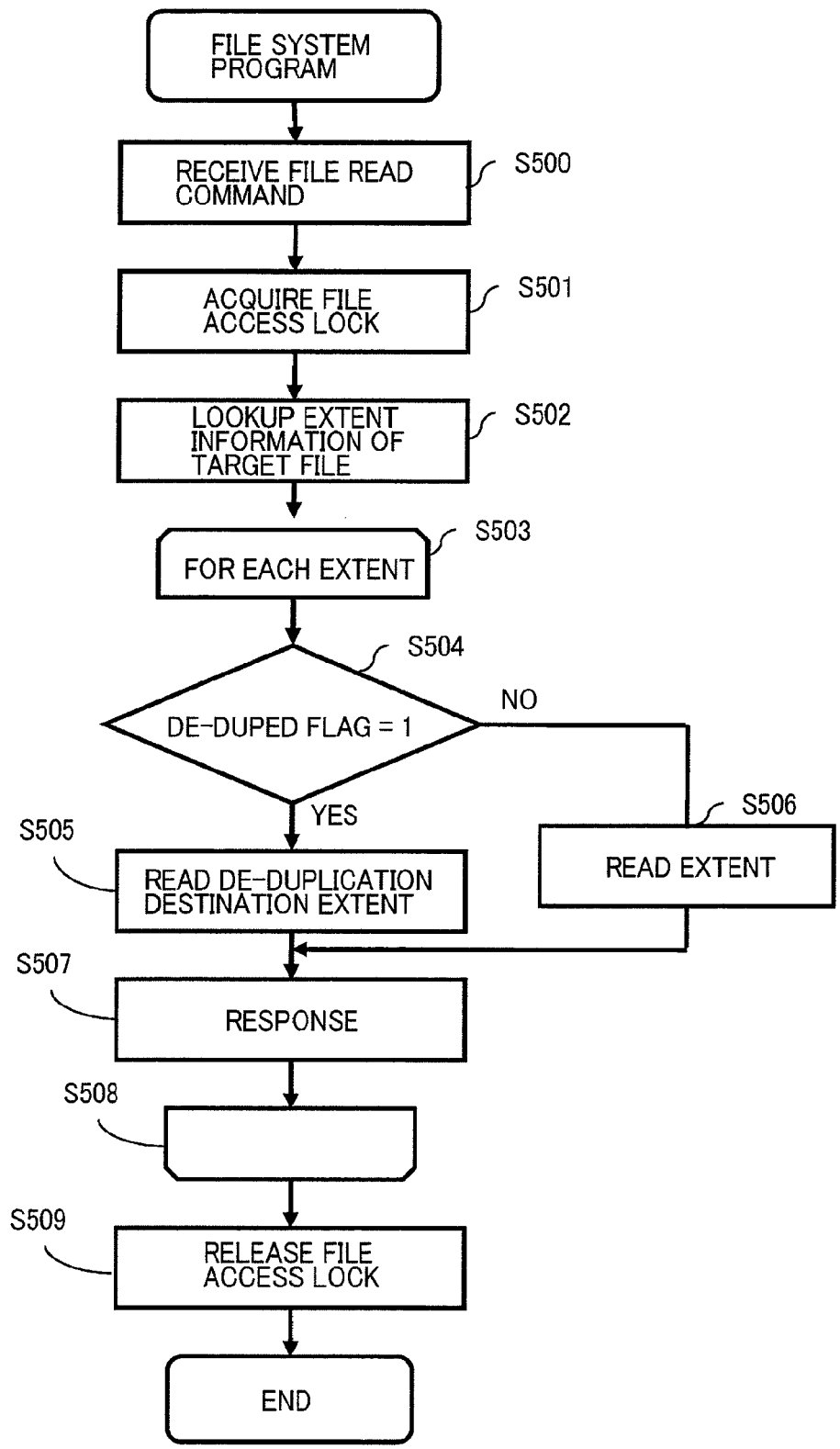
FIG. 30 is a flowchart showing read processing of a file system according to the third embodiment.

FIG. 30 is a flowchart showing read processing performed by the file system program 3022 according to the third embodiment when the file server 300 receives a file read command from the client server 200.

Upon receipt of a read file command, the file system program 3022 checks if the extent to be read is de-duplicated, and refers to the post de-duplication destination extent if required.

The file system program 3022 receives a file read command from an upper program such as the network file service program 3023 (S500).

Then, the file system program 3022 acquires the file access lock 30223 of the read target file (S501). If the file access lock 30223 is being used in another process and cannot be acquired, the file system program 3022 suspends the process until the file access lock 30223 can be acquired.

The file system program 3022 specifies at least one read target extent by checking through the extent information 30222 on the read target file (S502).

The file system program 3022 performs processes S504 to S507 on all the read target extents specified in S502 (S503).

The file system program 3022, referring to the extent extended property table 30222C of the extent in processing, moves to S505 when the de-duped flag is 1 and moves to S506 when the de-duped flag is 0 (S504).

The file system program 3022 reads from the disk-subsystem 400 the post de-duplication destination extent for the extent having the de-duped flag of 1 (S505).

Note that, although not shown in FIG. 30, the read processing from the disk-subsystem 400 is omitted when the cache of the read extent is left on the main memory 302.

On the other hand, the file system program 3022 reads the data on the disk specified by the extent information 30222 for the extent having the de-duped flag of 0 (S506).

The file system program 3022 returns the data block read into the main memory 302 as a response to the upper program (S507).

The file system program 3022 repeats the processes from S503 if there is any read target extent left, and otherwise moves to S509 (S508).

The file system program 3022 releases the file access lock 30223 (S509).

Figure 31:
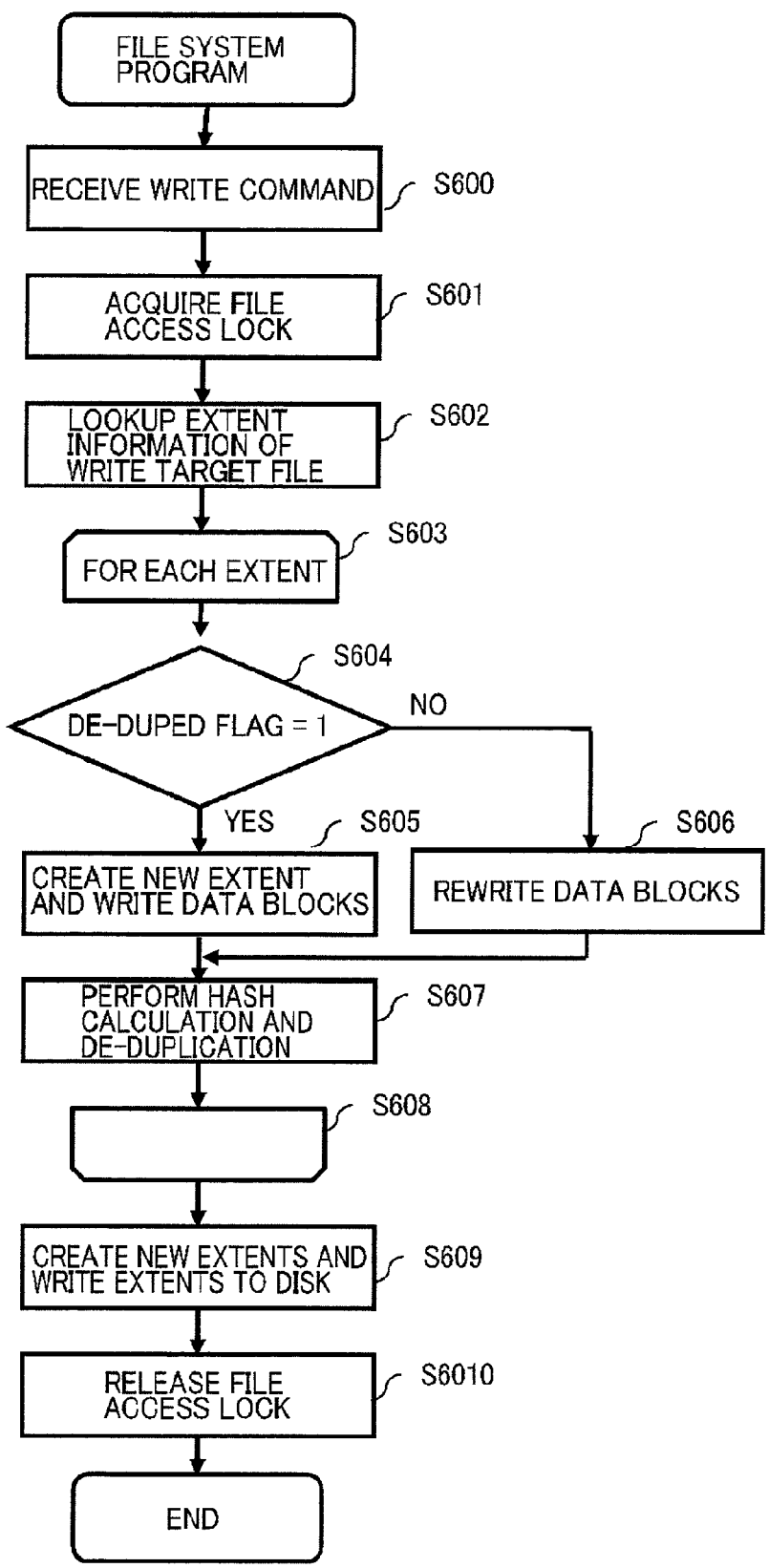
FIG. 31 is a flowchart showing write processing of the file system according to the third embodiment.

FIG. 31 is a flowchart showing write processing performed by the file system program 3022 according to the third embodiment when the file server 300 receives a file write command from the client server 200.

The file system program 3022 receives an write command from an upper program such as the network file service program 3023 (S600).

Then, the file system program 3022 acquires file access lock 30223 of the write target file (S601). If the file access lock 30223 is being used in another process and cannot be acquired, the file system program 3022 suspends the process until the file access lock 30223 can be acquired.

The file system program 3022 specifies at least one write target extent by checking through the extent information 30222 on the write target file (S602). Note that, although not shown in FIG. 31, the file system program 3022 proceeds to S609 when the write command is an additional write for a new region.

The file system program 3022 performs processes S604 to S607 on all the write target extents specified in S602 (S603).

The file system program 3022, refers to the extent extended property table 30222C of the extent in processing, and moves to S605 when the de-duped flag is 1 and moves to S606 when the de-duped flag is 0 (S604).

In the case of writing the de-duplicated extent, the file system program 3022 assigns a new disk region for the extent (S605). In this case, the file system program 3022 updates the extent information 30222, thereby updating the offset 30222A and size 30222B of the newly assigned region. Thereafter, the file system program 3022 updates the extent extended property table 30222C, thereby setting the de-duped flag to 0.

The file system program 3022 writes write data directly into the disk when the de-duped flag is 0 in S604 (S606).

The file system program 3022 calculates a hash value of the written data (S607). Then, the file system program 3022 checks the hash table 3035, and when a duplicated extent is found, performs de-duplication processing.

The file system program 3022 repeats processes S603 and thereafter if there is any write target extent left, and otherwise moves to S609 (S608).

The file system program 3022 creates a new extent for the write data in the region other than the existing extent by splitting the extent into fixed lengths, and writing the extent into the disk (S609). If the process target file is a de-duplicated file, the file system program 3022 performs hash calculation and de-duplication for the newly created extent.

The file system program 3022 releases the file access lock 30223 (S6010).

Figure 32:
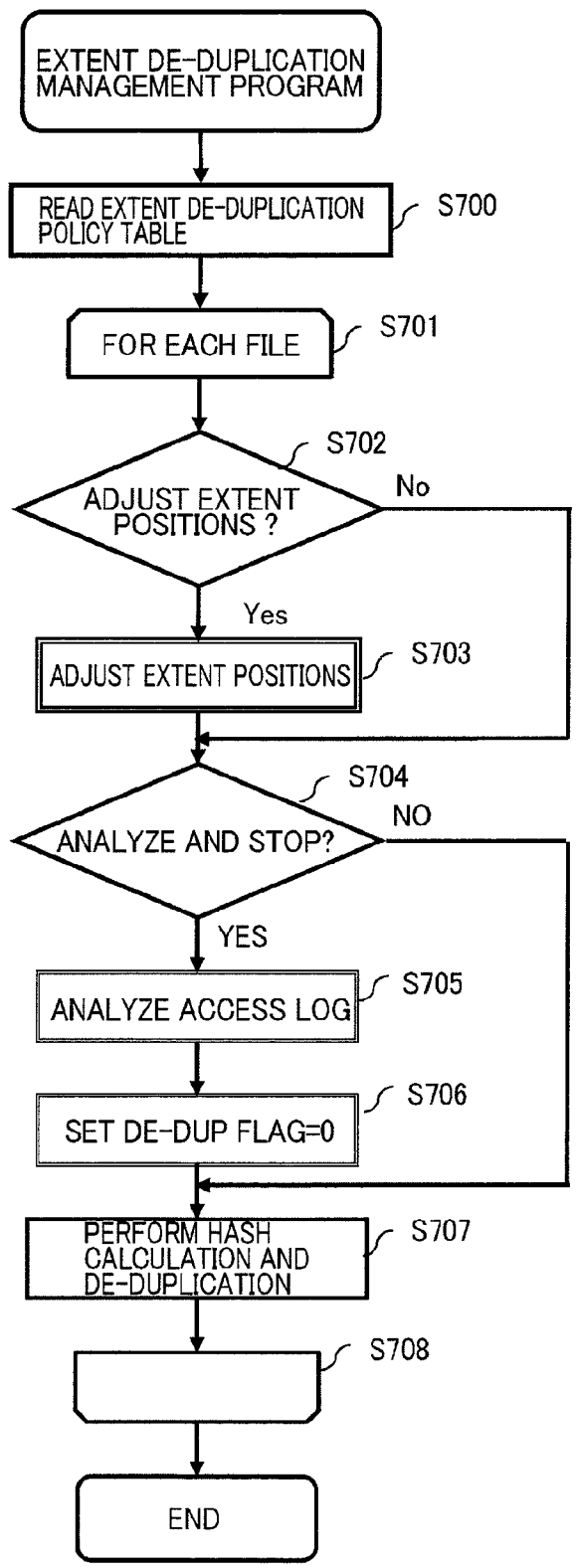
FIG. 32 is a flowchart of extent de-duplication management processing of the third embodiment.

FIG. 32 is a flowchart showing the operation of the extent de-duplication management program 3027 in the extent de-duplication management processing. Note that the process in S703 is described later with reference to FIG. 33.

The extent de-duplication management program 3027 reads the extent de-duplication policy table 3033 and acquires processing method 3033B for each file (S700).

The extent de-duplication management program 3027 performs processes S702 to S707 for each file (S701).

The extent de-duplication management program 3027 determines whether or not the file in processing requires extent position adjustment according to the processing method 3033B acquired in S700 (S702). The extent de-duplication management program 3027 executes S703 if the extent position adjustment is required, and otherwise executes S704.

The extent de-duplication management program 3027 instructs the file system program 3022 to adjust the extent position (S703). This process is described in detail later with reference to FIG. 33.

The extent de-duplication management program 3027 proceeds to S705 if "analyze and stop" is set as the processing method 3033B acquired in S700, and otherwise proceeds to S707 (S704).

The extent de-duplication management program 3027 analyzes the file access log 3034 to specify an extent having a reference frequency larger than a threshold value (S705).

The extent de-duplication management program 3027 instructs the file system program 3022 to set the de-dup flag of the corresponding extent to 0 (S706). Since the process in S706 is the same as S404 except that the process target flag is different, detailed description thereof is omitted.

The file system program 3022 calculates a hash value of each extent having the de-dup flag of 1 included in the file (S707). Then, the file system program 3022 checks the hash table 3035, and if a duplicated extent is found, performs de-duplication processing.

In the de-duplication processing, the file system program 3022 compares the contents of the first file to those of the second file for each extent and detects the extents having the same contents, when the extents having the same contents are found, the extent in the second file is deleted, and the extent in the first file is referred to when referring to the deleted extent in the second file.

The extent de-duplication management program 3027 continues processes S702 and thereafter if there is any file left to be processed (S708).

Figure 33:
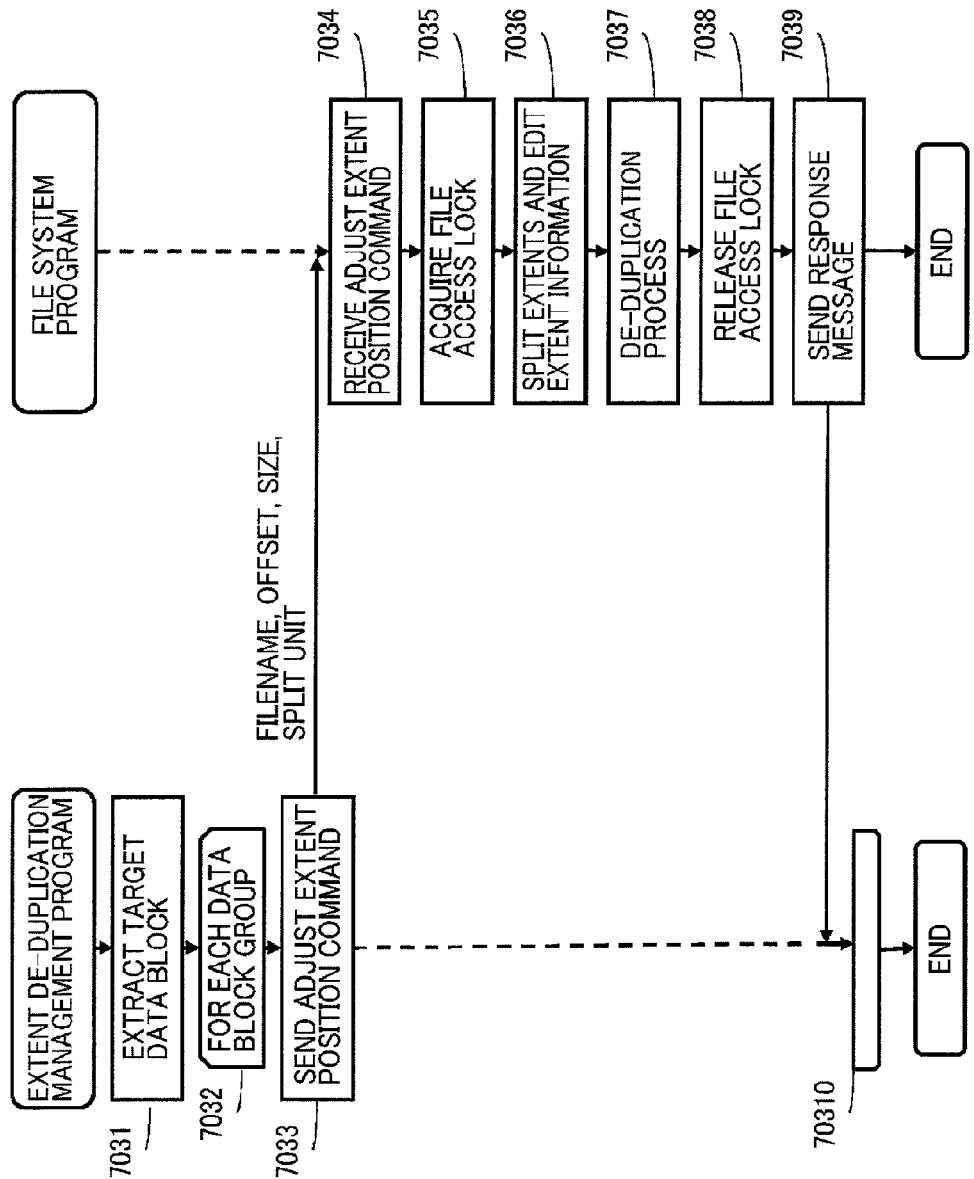
FIG. 33 is a flowchart of extent restructuring processing of the third embodiment.

FIG. 33 is a flowchart showing the operations of the extent de-duplication management program 3027 and the file system program 3022 in the extent position adjustment processing in S703.

The extent de-duplication management program 3027 extracts a data block to be a target for extent position adjustment (S7031). Note that the data block extraction processing is the same as that in S103 except that the processing method is changed from "split" to "set split position" and that "analyze and split" is eliminated. Thus, detailed description thereof is omitted.

Then, the extent de-duplication management program 3027 performs process S7033 for the entire set of data blocks found in S7031 (S7032).

Thereafter, the extent de-duplication management program 3027 transmits an adjust extent position command to the file system program 3022 (S7033). The adjust extent position command has, as arguments, file name, offset and size of a position adjustment target region, and split unit.

The file system program 3022 receives an adjust extent position command (S7034).

Then, the file system program 3022 acquires a file access lock 30223 of the file specified by the adjust extent position command (S7035). If the file access lock 30223 is being used in another process and cannot be acquired, the file system program 3022 suspends the process until the file access lock 30223 can be acquired.

The file system program 3022 splits, by unit size 3033C, a region from the first position specified by the offset value specified by the adjust extent position command to the second position specified by the value obtained by adding the size value to the offset value, thereby creating a new extent for each region (S7036). Note that although not shown in FIG. 33, the original extent shrink process and the extent create process for the remaining data region are also performed, as in the case of S104, during the creation of the new extent.

The file system program 3022 performs hash calculation and de-duplication processing for the extent created and changed in S7036 (S7037).

The file system program 3022 releases the file access lock 30223 (S7038).

Then, the file system program 3022 returns a response message to the extent de-duplication management program 3027 (S7039).

The extent de-duplication management program 3027 repeats processes S7032 and thereafter if there is any data block left to be subjected to position adjustment, and otherwise terminates the extent position adjustment process (S70310).

Figure 34:
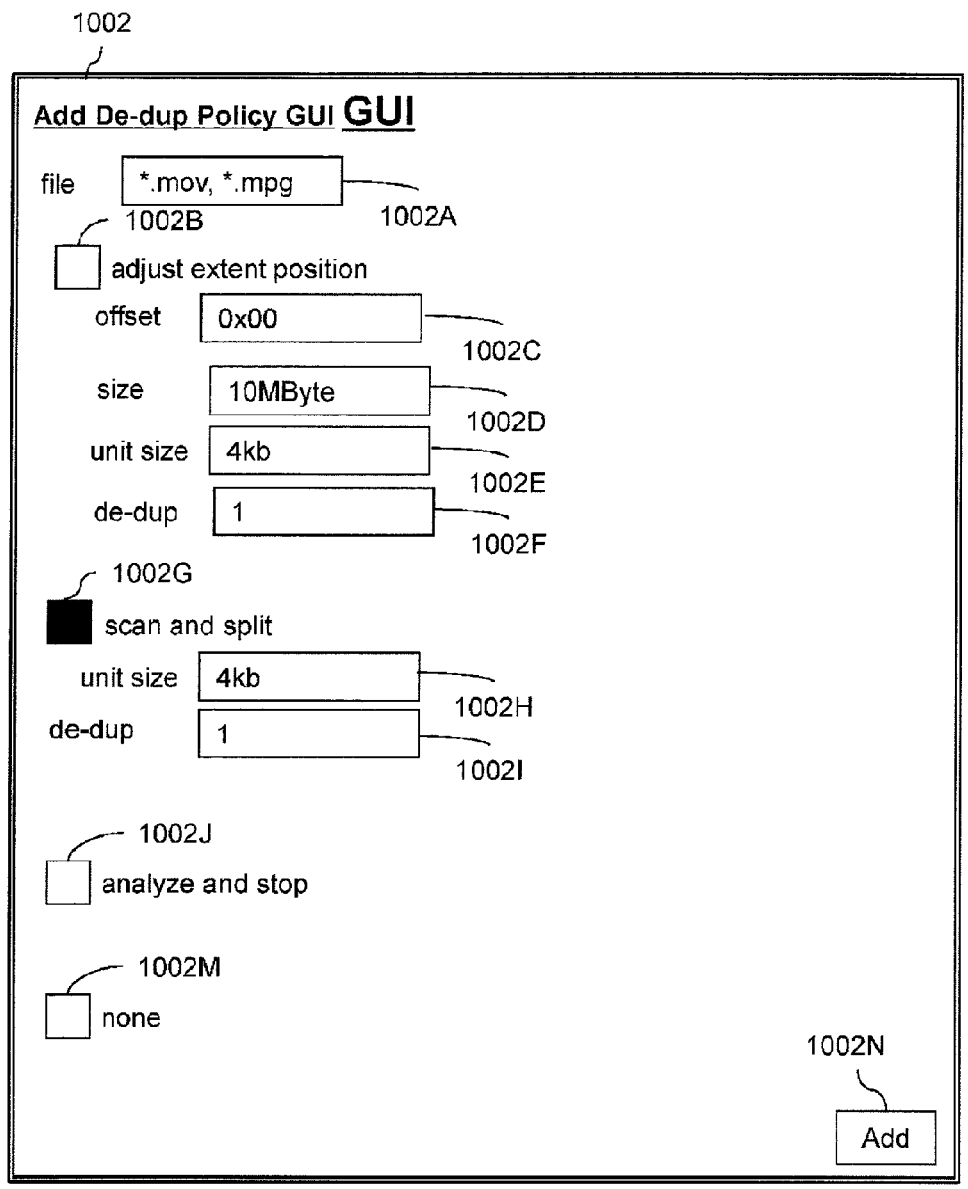
FIG. 34 is an image diagram showing a user interface for registering a compression policy of the third embodiment.

FIG. 34 is a diagram showing a user interface for registering the extent de-duplication policy table 3033.

The user interface is provided to the administrator by management GUI program 1001. The extent de-duplication policy is set by the administrator inputting the settings in the user interface.

1002A denotes an input box for specifying a target file 3033A to be a de-duplication target.

1002B denotes a check box for setting "adjust extent position" as the processing method 3033B. When the check box 1002B is activated, 1002G, 1002J and 1002M are deactivated.

1002C denotes an input box for inputting the offset of target region 3033D.

1002D denotes an input box for inputting the size of target region 3033D.

1002E denotes an input box for inputting unit size 3033C.

1002F denotes an input box for inputting de-dup flag 3033E.

1002G denotes a check box for setting "scan and stop" as processing method 3033B. When check box 1002G is activated, 1002B, 1002J and 1002M are deactivated.

1002H denotes an input box for inputting unit size 3033C.

1002I denotes an input box for inputting de-dup flag 3033E.

1002J denotes a check box for setting "analyze and stop" as processing method 3033B. When check box 10023 is activated, 1002B, 1002G and 1002M are deactivated.

1002M denotes a check box for setting "none" as processing method 3033B. When check box 1002M is activated, 1002B, 1002G and 1002) are deactivated.

1002N denotes a button for reflecting the input contents to the extent de-duplication policy table 3033.

As described above, according to the present embodiment, appropriate control of data blocks or data block groups inside a file is made possible.

Moreover, in the present embodiment, the file system program 3022 having an extent de-duplication function provides an upper program with an interface for adjusting the extent position and specifying whether or not de-duplication is to be performed.

This allows the split data to be arranged so that the de-duplication process is effectively performed. Moreover, a portion with high performance requirements can be set not to be subjected to the de-duplication.

The extent de-duplication management program 3027 according to the present embodiment can instruct the file system program 3022 to adjust the extent position so as to increase de-duplication efficiency, according to the extent de-duplication policy table 3033 set by the administrator.

Moreover, the file server 300 according to the present embodiment can receive specification of the splitting method for de-duplication from the upper program, and thus the splitting method can be changed according to the data arrangement in the file.

Thus, the extent position adjustment can be performed so as to improve the de-duplication. As a result, the de-duplication effect can be increased.

Moreover, a frequently-referred extent is excluded from the de-duplication target, and thus the access target data blocks can be dispersed. Thus, the performance can be improved.

As a concrete example, improvement in de-duplication efficiency can be expected by aligning the adjusted extent position in a connected file obtained by connecting a plurality of files with each file. Moreover, a frequently-accessed region of a clone file of a virtual machine image having many duplicated extents is excluded from the de-duplication target. Thus, improvement in access performance can be expected.

As described above, in the present embodiment, the file system provides the upper program with interfaces for changing the size, the storage position, and the processing method of the extent structure for managing the continuous data block groups. The file system creates extents for the region specified by the upper program and performs processing for each function using the specified processing method.

Thus, the file server can perform processing for the extent optimized by the upper program, and thus the effects of the various functions of the file system can be improved. Moreover, since the processing method is set for each extent, the amount of management information can be reduced compared with the case where the processing method is changed in units of data blocks.

In the present embodiment, the file system in the file server provides an upper program with an interface for changing the size, the processing method and the storage position of the extent. Hierarchical control, compression and de-duplication management programs in the file server use the interface of the file system to optimize the storage position and processing method of the extent for each process. According to the present embodiment, improvement in capacity efficiency for the hierarchical control, reduction in process overhead and response time for the compression, and improvement in capacity efficiency and response time for the de-duplication can be expected.

Furthermore, when the processing contents such as change in the destination storage device and the compression processing contents can be specified only by file units, for example, the processing contents can be set only for the whole file even if the data contents in the file differ according to the position in the file, for example. Therefore, even if data characteristics or performance requirements vary according to the data storage position in the file, processing contents suitable for the data contents cannot be selected. Meanwhile, according to the present embodiment, processing contents for data in a file can be controlled for each data block of an arbitrary size.

Moreover, when the processing contents can be changed only by units of data blocks, for example, the processing contents need to be individually managed for each of the data blocks, and thus vast amounts of management data have to be stored. At the same time, the data block for which the processing contents are specified has a fixed size, and thus flexibility in processing is small. Meanwhile, according to the present embodiment, processing contents for data in a file can be controlled for each data block of an arbitrary size.

Although the preferred embodiments of the present invention have been described, these are provided for illustrative purposes only and are not to be construed as limitations on the scope of the invention. The present invention can be implemented in various other ways.

The invention claimed is:

1. An information apparatus comprising:
    a file system that manages as an extent, one or more data blocks in a file stored in a recording medium;
    a change request reception unit that receives a change request to change a configuration of an extent; and
    a configuration change unit that changes a configuration or property value of an extent according to the change request;
    wherein the change request includes address information indicating a position on the recording medium, and data length information indicating a data length from the position, and
    wherein the configuration change unit splits the extent at a first position specified by the address information and a second position specified by a value obtained by adding the address information and the data length information.

2. The information apparatus according to claim 1, further comprising:
    a move request reception unit that receives an extent move request to move an extent from a first recording medium storing the extent to a second recording medium different from the first recording medium in at least one of a data read rate and a data write rate, the extent formed between the first and second positions by splitting the pre-split extent at the first and second positions; and
    a movement control unit that moves the extent formed between the first and second positions from the first recording medium to the second recording medium in response to the extent move request.

3. The information apparatus according to claim 2, wherein
    the file recorded in the first recording medium is a file in which audio or video data is recorded,
    the extent to be moved from the first recording medium to the second recording medium is a portion in which a predetermined amount of audio or video data from the beginning of the audio or video data recorded in the file is recorded, and
    the second recording medium is a recording medium having higher data read rate than the first recording medium.

4. The information apparatus according to claim 2, wherein
    the file to be recorded in the first recording medium is a file in which a virtual disk image or a connected file is recorded, and
    the extent to be moved from the first recording medium to the second recording medium is a portion in which a specific file in the virtual machine image is recorded.

5. The information apparatus according to claim 1, further comprising:
a compressibility information storage unit that stores compressibility information for each extent in the file, the compressibility information indicating whether or not the extent is a compression target;
a compressibility information update unit that receives compressibility information for an extent formed between the first and second positions, and stores the compressibility information in the compressibility information storage unit;
a compression request reception unit that receives a compression request to compress the file; and
a compression processing unit that compresses only an extent being a compression target by referring to compressibility information for the each extent when compressing the file in response to the compression request.

6. The information apparatus according to claim 5,
Wherein the compressibility information update unit receives information specifying whether or not compression is to be performed on the extent formed between the first and second positions, and stores the information in the compressibility information storage unit.

7. An information apparatus comprising:
a file system that manages as an extent, one or more data blocks in a file stored in a recording medium;
a change request reception unit that receives a change request to change a configuration of an extent; and
a configuration change unit that changes a configuration or property value of an extent according to the change request;
wherein the change request includes data length information indicating a data length,
wherein the configuration change unit splits a first file stored in the recording medium into a plurality of extents at positions separated by the data length starting from a predetermined position in the first file, and splits a second file stored in the recording medium into a plurality of extents at positions separated by the data length starting from a predetermined position in the second file,
the information apparatus further comprising:
a de-duplication processing unit that compares a content of the first file with a content of the second file on an extent-by-extent basis, and
deletes the extent in the second file when detecting extents having the same contents, and performs control so that the extent in the first file is referred to when the extent deleted from the second file was to be referred.

8. The information apparatus according to claim 7, wherein the first and second files are files specified by a user.

9. The information apparatus according to claim 7, wherein the first and second files are connected files.

10. An information apparatus comprising:
a file system that manages as an extent, one or more data blocks in a file stored in a recording medium;
a change request reception unit that receives a change request to change a configuration of an extent; and
a configuration change unit that changes a configuration or property value of an extent according to the change request;
wherein when the change request includes address information indicating a position on the recording medium and data length information indicating a data length from the position, the configuration change unit splits the extent at a first position specified by the address information and a second position specified by a value obtained by adding up the address information and the data length information, and
wherein a processing content for the extent is changed according to the property value;
the information apparatus comprising:
a move request reception unit that receives an extent move request to move an extent from a first recording medium storing the extent to a second recording medium different from the first recording medium in at least one of a data read rate and a data write rate, the extent formed between the first and second positions by splitting the pre-split extent at the first and second positions; and
a movement control unit that moves the extent formed between the first and second positions from the first recording medium to the second recording medium in response to the extent move request, when the file recorded in the first recording medium is a file in which audio or video data is recorded,
the extent to be moved from the first recording medium to the second recording medium is a portion in which a predetermined amount of audio or video data from the beginning of the audio or video data recorded in the file is recorded, and
the second recording medium is a recording medium having higher data read rate than the first recording medium,
when the file to be recorded in the first recording medium is a file in which a virtual disk image or a connected file is recorded, the extent to be moved from the first recording medium to the second recording medium is a portion in which a specific file in the virtual machine image is recorded,
when the information apparatus further comprises a compressibility information storage unit that stores compressibility information for each extent in the file, the compressibility information indicating whether or not the extent is a compression target,
the information apparatus further comprises:
a compressibility information update unit that receives compressibility information for an extent formed between the first and second positions, and stores the compressibility information in the compressibility information storage unit;
a compression request reception unit that receives a compression request to compress the file; and
a compression processing unit that compresses only an extent being a compression target by referring to the compressibility information for the each extent when compressing the file in response to the compression request,
the compressibility information update unit receives information specifying whether or not compression is to be performed on the extent formed between the first and second positions, and stores the information in the compressibility information storage unit, when the change request includes data length information indicating data length,
the configuration change part splits a first file stored in the recording medium into a plurality of extents at positions separated by the data length starting from a predetermined position in the first file, and splits a second file stored in the recording medium into a plurality of extents at positions separated by the data length starting from a predetermined position in the second file, and
the information apparatus further comprising:
a de-duplication processing unit that compares a content of the first file with a content of the second file on an extent-by-extent basis, and deletes the extent in the second file when detecting extents having the same contents, and performs control so that the extent in the first file is referred to when the extent deleted from the second file was to be referred,
the first and second files are files specified by a user or a connected file, and
when the change request includes address information indicating a position on the recording medium,
the configuration change unit splits the extent at a position specified by the address information.

* * * * *